United States Patent
Shiratori et al.

(10) Patent No.: US 8,792,068 B2
(45) Date of Patent: Jul. 29, 2014

(54) LIGHTING DEVICE AND ELECTRONIC DEVICE

(75) Inventors: Koya Shiratori, Matsumoto (JP); Akio Fukase, Chino (JP)

(73) Assignee: Seiko Epson Corporation, Tokyo (JP)

( * ) Notice: Subject to any disclaimer, the term of this patent is extended or adjusted under 35 U.S.C. 154(b) by 396 days.

(21) Appl. No.: 12/858,660

(22) Filed: Aug. 18, 2010

(65) Prior Publication Data
US 2011/0058119 A1 Mar. 10, 2011

(30) Foreign Application Priority Data

Sep. 4, 2009 (JP) .................. 2009-204434
Sep. 10, 2009 (JP) .................. 2009-208982

(51) Int. Cl.
*G02F 1/1337* (2006.01)
*H05B 37/02* (2006.01)
*F21V 21/00* (2006.01)

(52) U.S. Cl.
USPC ........... 349/61; 349/69; 315/294; 362/249.01

(58) Field of Classification Search
CPC .................................................... H05B 37/029
USPC ............... 349/61–63, 69; 315/152–155, 294; 362/249.01
See application file for complete search history.

(56) References Cited

U.S. PATENT DOCUMENTS

| 6,005,350 A | 12/1999 | Hachiya et al. |
| 6,072,477 A | 6/2000 | Ueno |
| 2005/0174064 A1* | 8/2005 | Agostinelli et al. ....... 315/169.3 |
| 2006/0290623 A1 | 12/2006 | Okabe et al. |

FOREIGN PATENT DOCUMENTS

| JP | 04-190326 A | 7/1992 |
| JP | 09-223581 A | 8/1997 |
| JP | 10-079296 A | 3/1998 |
| JP | 2007-005072 A | 1/2007 |
| JP | A-2007-17720 | 1/2007 |
| JP | 2008-218175 A | 9/2008 |

\* cited by examiner

*Primary Examiner* — Uyen Chau N Le
*Assistant Examiner* — Michael Mooney
(74) *Attorney, Agent, or Firm* — Oliff PLC

(57) ABSTRACT

A lighting device at least has: a plurality of light emitting elements that emit light by a forward direction current; a direct-current power supply; a first wiring and a second wiring for supplying electrical power to the plurality of light emitting elements from the direct-current power supply; and a switch for switching the polarity of the electrical power to be supplied to the first wiring and the second wiring; in which the plurality of light emitting elements include forward direction connection in which the forward direction current flows when the electrical power having a positive polarity is applied to the first wiring and reverse direction connection in which the forward direction current flows when the electrical power having a positive polarity is applied to the second wiring and being connected between the first wiring and the second wiring.

6 Claims, 23 Drawing Sheets

<1st LIGHT EMITTING DEVICE>

<2nd LIGHT EMITTING DEVICE>

LIGHTING DEVICE AND ELECTRONIC DEVICE

BACKGROUND

1. Technical Field

The present invention relates to a lighting device and an electronic device.

This application claims priority from JP-A-2009-204434, filed on Sep. 4, 2009 and JP-A-2009-208982, filed on Sep. 10, 2009, the content of which is hereby incorporated by reference.

2. Related Art

A front light is known which is a lighting device disposed on the display surface of a liquid crystal panel and illuminating the display surface. In general, the front light is used for reflection type display panels. When there is sufficient outside light, the light is turned off and the front light becomes a transparent plate to transmit the front light in a transparent plate state to thereby perform reflection display by the outside light in many cases. Therefore, the front light is frequently used for penetration type display panels. It is said that power consumption can be reduced rather than back light that is turned on irrespective of the existence of outside light.

For example, JP-A-2007-17720 discloses a front light having, on a reflection type liquid crystal display device, an organic EL device as a light source having an anode containing a transparent conductive material, such as ITO (Indium Tin Oxide), an organic EL layer disposed on the anode, and a cathode (reflective film) containing metal, such as aluminum, disposed on the organic EL layer.

FIG. 32 is an equivalent circuit diagram showing the electrical structure of a former front light. A front light 501 has an anode wiring 503 connected to an anode of a direct current power supply 502 and a cathode wiring 504 connected to a cathode thereof. The anode wiring 503 and the cathode wiring 504 are branched into a plurality of wiring lines and a plurality of light emitting elements 505 that are connected in parallel and emit light by a forward direction current are provided between each anode wiring 503a and each cathode wiring 504a.

However, the former front light has a problem in that since the organic EL device has been used as the light source, it has been difficult to secure sufficient life. In detail, organic EL materials are materials that are being developed and have a problem in that the luminance life is short.

Moreover, due to a structure such that, in both the cases where the light is ON and OFF, the display surface is observed through the front light itself, the size (lighting area) of the organic EL device having a reflective film (cathode) and serving as a light shielding portion has been made small in such a manner as not to influence display. Therefore, in order to obtain an expected luminance, a high current needs to be applied, which increases the temperature of the organic EL device, resulting in a problem in that the organic EL device deteriorates. More specifically, there has been a problem in that it has been difficult to suppress deterioration of light emitting elements.

SUMMARY

An advantage of some aspects of the invention is that the invention can be realized as the following aspects or application examples.

Application Example 1

A lighting device according to this application example at least has: a plurality of light emitting elements that emit light by a forward direction current; a direct-current power supply; a first wiring and a second wiring for supplying electrical power to the plurality of light emitting elements from the direct-current power supply; and a switch for switching the polarity of the electrical power to be supplied to the first wiring and the second wiring; in which the plurality of light emitting elements include forward direction connection in which the forward direction current flows when the electrical power having a positive polarity is applied to the first wiring and reverse direction connection in which the forward direction current flows when the electrical power having a positive polarity is applied to the second wiring and are connected between the first wiring and the second wiring.

According to the structure, the light emitting elements connected in a forward direction and the light emitting elements connected in a reverse direction are connected between the first wiring and the second wiring. Thus, when the electrical power having a positive polarity is applied to the first wiring, the light emitting elements connected in a forward direction emit light and when the electrical power having a positive polarity is applied to the second wiring, the light emitting elements connected in a reverse direction emit light. Thus, by changing the polarity of the electrical power to be supplied to the first wiring and the second wiring, the light emitting elements can be made to alternately emit light. While one kind of the light emitting elements emit light, the other kind of the light emitting elements do not emit light. Thus, the other kind of the light emitting elements can be cooled. As a result, deterioration due to that the temperature of the light emitting elements becomes high is suppressed to delay the time when the luminance decreases (display quality deteriorates) compared with the case where only one light emitting element is made to continuously emit light, and thus the life can be extended. By making one kind of the light emitting elements continuously emit light until the luminance thereof decreases to a lower threshold luminance, and then switching to the other kind of the light emitting elements and making the other kind of the light emitting elements continuously emit light, the light emitting period of time can be extended compared with the case where only one emitting light is made to continuously emit light. As a result, the life of the lighting device can be extended. In addition, when problems arise in one kind of the light emitting elements, light can be made to emit using the other kind of the light emitting elements.

Application Example 2

In the lighting device according to the application example above, the light emitting elements are preferably connected between the first wiring and the second wiring so that the forward direction connection and the reverse direction connection alternately appear.

According to the structure, since one kind of the light emitting elements (e.g., light emitting elements connected in a forward direction was made) and the other kind of the light emitting elements (e.g., light emitting elements connected in a reverse direction) are alternately connected, the interval between the one kind of the light emitting elements and one kind of the light emitting elements adjacent thereto or the interval between the other kind of the light emitting elements and the other kind of the light emitting elements adjacent thereto can be made substantially uniform. Thus, light emission by the one kind of the light emitting elements or light emission by the other kind of the light emitting elements can be uniformly (with a good balance) performed in a light emitting region.

Application Example 3

The lighting device according to the application example above preferably has a detector for detecting the luminance of the light emitting elements or the voltage between both ends of the light emitting elements.

According to the structure, the detector detects the luminance or the voltage of the light emitting elements. Thus, when the luminance decrease to a lower threshold value, light emission by the one kind of the light emitting elements and light emission by the other kind of the light emitting elements are switched to thereby maintain a luminance higher than the lower threshold luminance.

Application Example 4

In the lighting device according to the application example above, the switch preferably switches the polarity of the electrical power according to the luminance or the voltage detected by the detector.

According to the structure, the electrical power having a positive polarity is applied to the first wiring or the second wiring according to the luminance or the voltage. Thus, for example, the one kind of the light emitting elements can be made to emit light until the luminance reaches the lower threshold value. Then, the light emitting element is switched to the other kind of the light emitting elements, and then the other kind of the light emitting elements can be made to emit light. Or, for example, the luminance can also be gradually reduced, such that when the luminance reaches a certain luminance, light emission is switched to the light emission by either one of the light emitting elements, and when the luminance reaches another certain luminance, light emission is switched to the light emission by either one kind of the light emitting elements.

Application Example 5

In the lighting device according to the application example above, the detector is an optical sensor.

According to the structure, since the luminance is detected by the optical sensor, a luminance equal to or higher than a given luminance can be maintained by switching to the other kind of the light emitting elements from the light emitting element when the luminance decreases to a certain luminance.

Application Example 6

The lighting device according to the application example above preferably has: a light emitting region in which the plurality of light emitting elements are disposed; and further a light emitting element for detection provided in the circumference of the light emitting region; in which the detector detects the luminance of light emitted by the light emitting element for detection.

According to the structure, since the light emitting element for detection is provided in the circumference of the light emitting region, the luminance of the light emitting elements can be detected without reducing a luminance required in the light emitting region.

Application Example 7

A lighting device according to this application example at least has: a plurality of light emitting elements that emit light by a forward direction current; an alternating-current power supply; and a first wiring and a second wiring for supplying electrical power to the plurality of light emitting elements from the alternating-current power supply; in which the plurality of light emitting elements include forward direction connection in which the forward direction current flows when the electrical power having a positive polarity is applied to the first wiring and reverse direction connection in which the forward direction current flows when the electrical power having a positive polarity is applied to the second wiring and are connected between the first wiring and the second wiring.

According to the structure, the light emitting elements connected in a forward direction and the light emitting elements connected in a reverse direction are connected between the first wiring and the second wiring, and further connected to the alternating-current power supply. Thus, when the electrical power having a positive polarity is applied to the first wiring, the light emitting elements connected in a forward direction emit light and when the electrical power having a positive polarity is applied to the second wiring, the light emitting elements connected in a reverse direction emit light. Thus, by changing the polarity of the electrical power to be supplied to the first wiring and the second wiring, the light emitting elements can be made to alternately emit light. While one kind of the light emitting elements emit light, the other kind of the light emitting elements do not emit light. Thus, the other kind of the light emitting elements can be cooled. As a result, deterioration due to that the temperature of the light emitting elements becomes high is suppressed to delay the time when the luminance decreases (display quality deteriorates) compared with the case where only one light emitting element is made to continuously emit light, and thus the life can be extended. In addition, even when a switch is not used, the one kind of the light emitting elements and the other kind of the light emitting elements can be alternately made to emit.

Application Example 8

In the lighting device according to the application example above, the light emitting elements are preferably connected between the first wiring and the second wiring so that the forward direction connection and the reverse direction connection alternately appear.

According to the structure, since one kind of the light emitting elements (e.g., light emitting elements connected in a forward direction was made) and the other kind of the light emitting elements (e.g., light emitting elements connected in a reverse direction) are alternately connected, the interval between the one kind of the light emitting elements and one kind of the light emitting elements adjacent thereto or the interval between the other kind of the light emitting elements and the other kind of light emitting elements adjacent thereto can be made substantially uniform. Thus, light emission by the one kind of the light emitting elements or light emission by the other kind of the light emitting elements can be performed with a good balance in a light emitting region. Thus, light can be emitted uniformly (with a good balance) from the entire lighting device.

Application Example 9

A lighting device according to this application example has: a transparent substrate; a plurality of transparent first wirings and second wirings formed on the transparent substrate; and a plurality of light emitting elements that emit light by a forward direction current; in which the plurality of light emitting elements include forward direction connection in which the forward direction current flows when the electrical power having a positive polarity is applied to the first wiring and reverse direction connection in which the forward direction current flows when the electrical power having a positive polarity is applied to the second wiring and are connected between the first wiring and the second wiring and openings through which the light emitting elements emit light are formed in such a manner as to be overlapped with the first wiring or the second wiring.

According to the structure, the light emitting elements connected in a forward direction and the light emitting elements connected in a reverse direction are connected between the first wiring and the second wiring. Thus, when the electrical power having a positive polarity is applied to the first wiring, the light emitting elements connected in a forward direction emit light and when the electrical power having a positive polarity is applied to the second wiring, the light emitting elements connected in a reverse direction emit light. Thus, by changing the polarity of the electrical power to be supplied to the first wiring and the second wiring, the light emitting elements can be made to alternately emit light. While one kind of the light emitting elements emit light, the other kind of the light emitting elements do not emit light. Thus, the other kind of the light emitting elements can be cooled. As a result, deterioration due to that the temperature of the light emitting elements becomes high is suppressed to delay the time when the luminance decreases (display quality deteriorates) compared with the case where only one light emitting element is made to continuously emit light, and thus the life can be extended. By making one kind of the light emitting elements continuously emit light until the luminance thereof decreases to a lower threshold luminance, and then switching to the other kind of the light emitting elements and making the other kind of the light emitting elements continuously emit light, the light emitting period of time can be extended compared with the case where one light emitting element is made to continuously emit light. As a result, the life of the lighting device can be extended.

Application Example 10

In the lighting device according to the application example above, the lighting device is a front light disposed on the display surface of a liquid crystal panel.

According to the structure, the lighting device is disposed on the display surface of a liquid crystal panel as a front light, and thus even when outside light is not sufficiently obtained in a reflection type liquid crystal panel, light can be supplied from the front light, whereby the display quality can be increased.

Application Example 11

A lighting device according to this application example at least has: a plurality of light emitting elements that emit light by a forward direction current flowing from a first terminal to a second terminal; a direct-current power supply; and an anode wiring and a cathode wiring for supplying electrical power to the plurality of light emitting elements from the direct-current power supply; in which the lighting device has a plurality of light emitting units having a first light emitting element group containing the plurality of light emitting elements in which the first terminal is connected to the first anode wiring that is branched from the anode wiring, a second light emitting element group containing the plurality of light emitting elements in which the first terminal is connected to the second anode wiring that is branched from the anode wiring, and a common cathode wiring branched from the cathode wiring that is to be connected in common to the second terminal of the plurality of light emitting elements in the first light emitting element group and the second light emitting element group.

According to the structure, the first light emitting element group and the second light emitting element group are connected to the common cathode wiring. Thus, a common cathode region can be formed. Thus, compared with a structure such that each light emitting element group has a cathode and a common cathode wiring, the cathode area can be made small, and the area of a region, other than the cathode region, through which light passes can be enlarged. Thus, the opening ratio can be increased, and the amount of a current for achieving a required quantity of light can be reduced. As a result, the light emitting elements are prevented from generating heat, and thus deterioration of the light emitting element can be suppressed to extend the life.

Application Example 12

The lighting device according to the application example above preferably further has a switch for exclusively switching the connection between the anode wiring and the first anode wiring or the second anode wiring.

According to the structure, the use of the switch allows the first light emitting element group connected to the first anode wiring and the second light emitting element group connected to the second anode wiring to alternately emit light. Thus, for example, by making the one light emitting element group continuously emit light until the luminance of the one light emitting element group decreases to a lower threshold luminance, and then switching to the other light emitting element group, and making the other light emitting element group continuously emit light, the light emission period of time can be extended compared with the case where only one light emitting element group is made to continuously emit light. As a result, the life of the lighting device can be extended. In addition, when problems arise in one kind of the light emitting elements, light can be made to emit using the other kind of the light emitting elements.

Application Example 13

The lighting device according to the application example above preferably has a detector for detecting the luminance of the light emitting elements or the voltage between both ends of the light emitting elements.

According to the structure, the detector detects the luminance or the voltage of the light emitting elements. Thus, for example, light can be emitted until the luminance reaches a lower threshold luminance (can prevent the luminance from being lower than the lower threshold luminance). By using a switch in combination, the lighting device can be used while switching light emission by the one kind of the light emitting elements and light emission by the other kind of the light emitting elements when the luminance decreases to the lower threshold luminance, and thus luminance higher than the lower threshold luminance can be maintained for a long period of time.

Application Example 14

In the lighting device according to the application example above, the switch preferably electrically connects the anode wiring and the first anode wiring or the second anode wiring branched from the anode wiring according to the luminance or the voltage detected by the detector.

According to the structure, electrical power is applied to the first anode wiring or the second anode wiring according to the luminance or the voltage. Thus, for example, the one kind of the light emitting elements can be made to emit light until the luminance reaches a lower threshold luminance, and then the light emitting elements can be automatically switched to the other kind of the light emitting elements and making the other kind of the light emitting elements emit light. Or, for example, the luminance can also be gradually reduced, such that when the luminance reaches a certain luminance, either one of the light emitting elements is made to emit light, and when the luminance reaches another certain luminance, the light emitting element is switched to the other kind of the light emitting elements, and then the other kind of the light emitting elements are made to emit light.

Application Example 15

In the lighting device according to the application example above, the detector is an optical sensor.

According to the structure, the optical sensor detects the luminance. Thus, when the luminance decrease to a certain luminance, the light emitting element is switched from the one kind of the light emitting elements to the other kind of the light emitting elements to thereby maintain a luminance equal to or higher than a given luminance.

Application Example 16

The lighting device according to the application example above preferably has a light emitting region in which the plurality of light emitting elements are disposed, and further has a light emitting element for detection provided in the circumference of the light emitting region, in which the detector detects the luminance of light emitted by the light emitting elements for detection.

According to the structure, the light emitting elements for detection are provided in the circumference of the light emitting region. Thus, the luminance of the light emitting elements can be detected without reducing a luminance required in the light emitting region.

Application Example 17

A lighting device according to this application example has: a transparent substrate; a plurality of transparent anode wirings and cathode wirings formed on the transparent substrate; and a plurality of light emitting elements that emit light by a forward direction current, in which a first anode wiring and a second anode wiring branched from the anode wiring are formed at both sides of a common cathode wiring branched from the cathode wiring; and the lighting device has a first light emitting element group containing the plurality of light emitting elements that emit light by a forward direction current flowing from the first anode wiring to the common cathode wiring and a second light emitting element group containing the plurality of light emitting elements that emit light by a forward direction current flowing from the second anode wiring to the common cathode wiring.

According to the structure, the first light emitting element group and the second light emitting element group are provided on the transparent substrate using the common cathode wiring. Thus, a common cathode region can be two-dimensionally formed. Therefore, the area of the cathode region can be made small and the area of a region, other than the cathode region, through which light passes can be enlarged compared with the structure such that the respective light emitting element groups use separate cathode wirings. Thus, the opening ratio can be increased, and the amount of a current for achieving a required quantity of light can be reduced. As a result, the light emitting elements are prevented from generating heat, and thus deterioration of the light emitting element can be suppressed to extend the life.

Application Example 18

In the lighting device according to the application example above, the lighting device is a front light disposed on the display surface of a liquid crystal panel.

According to the structure, the lighting device is disposed as a front light on the display surface of a liquid crystal panel. Thus, even when outside light is not sufficiently obtained in a reflection type liquid crystal panel, light can be supplied from the front light to increase the display quality.

Application Example 19

An electronic device according to this application example has the lighting device described above.

According to the structure, deterioration of the light emitting elements can be suppressed, and thus an electronic device having a long life can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments specifying the invention will be described with reference to the drawings. The drawings to be used are enlarged or reduced in size so that portions to be described can be recognized.

First Embodiment

Structure of Reflection Type Liquid Crystal Device having Lighting Device

Figure 1:
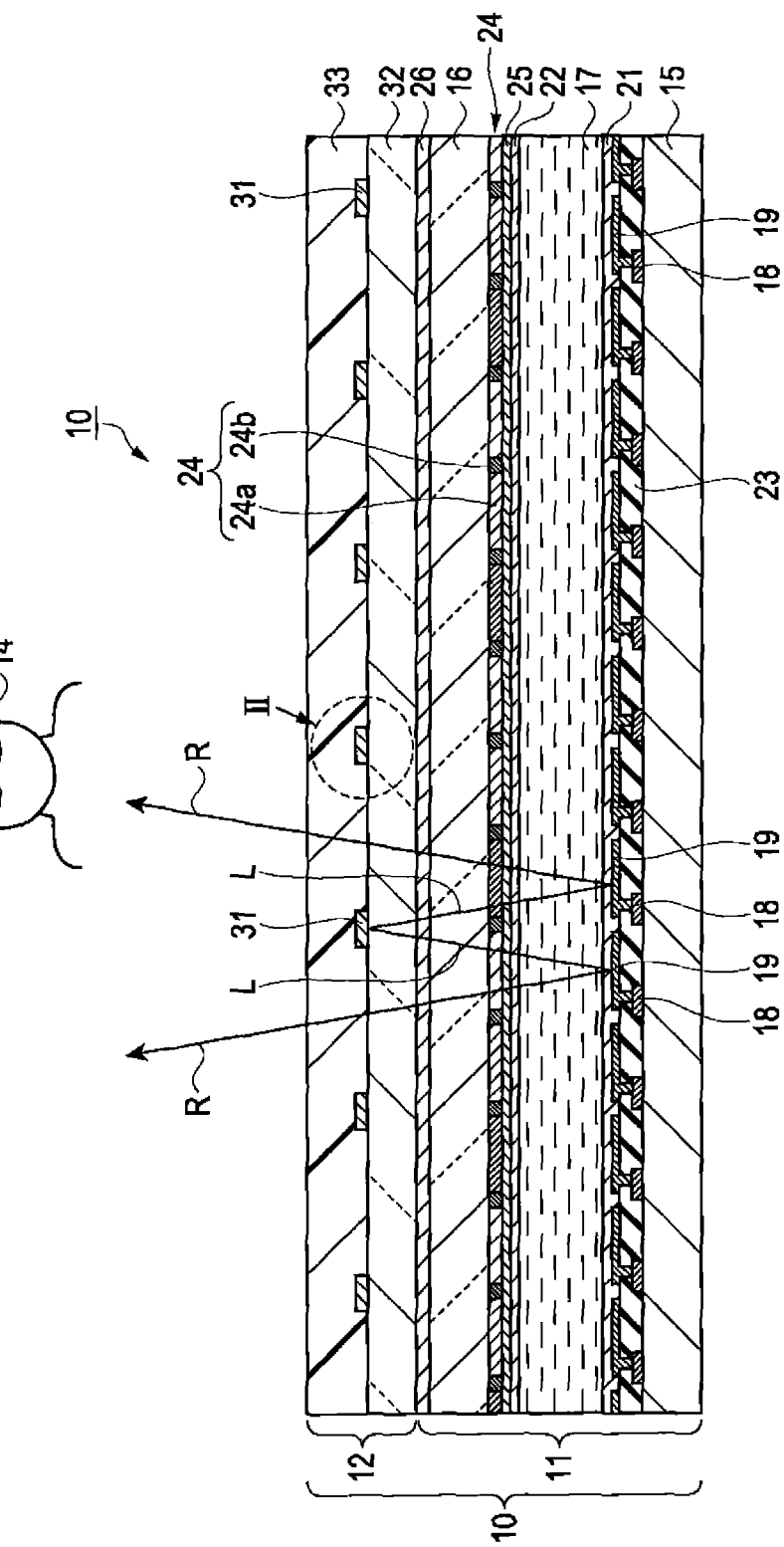
FIG. 1 is a schematic cross sectional view showing an organic EL device as a lighting device of a first embodiment and the structure of a reflection type liquid crystal device using the organic EL device as a front light.
Figure 2:
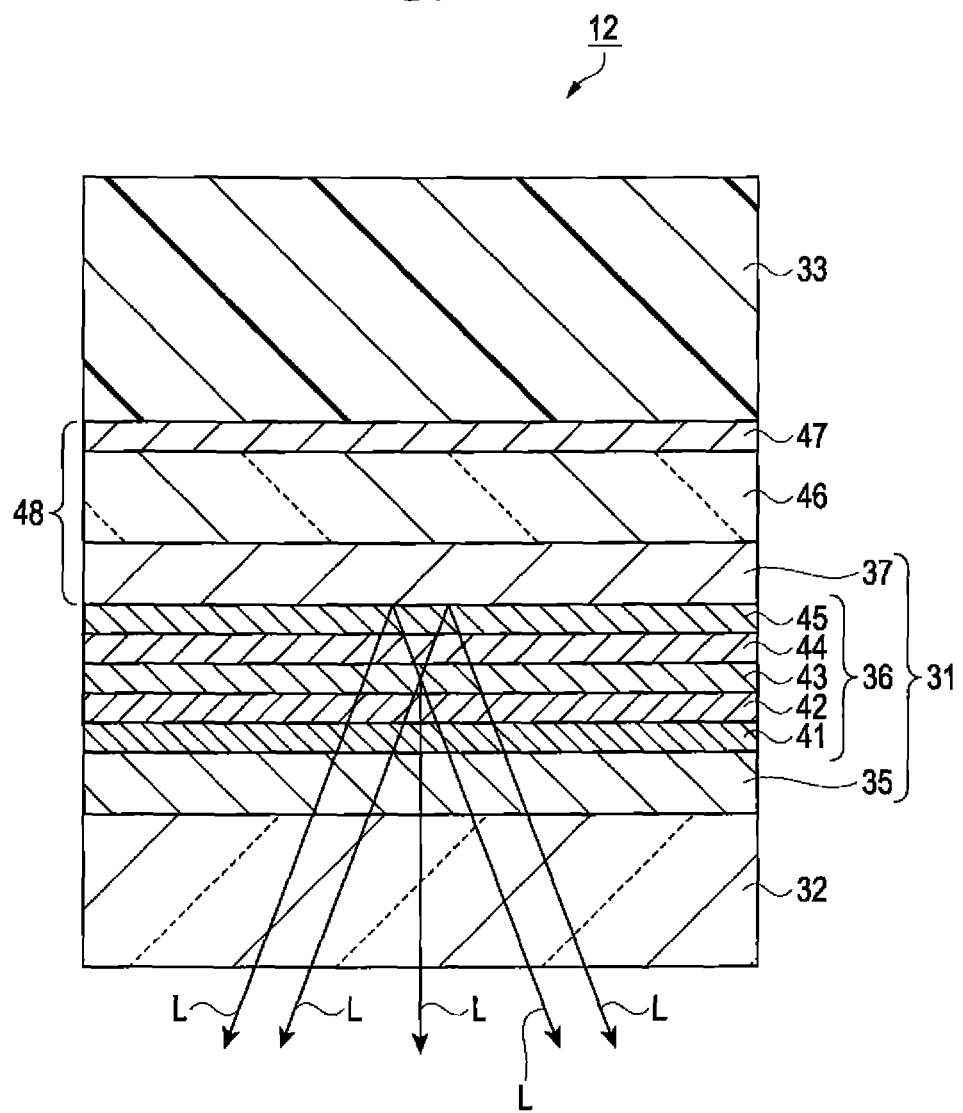
FIG. 2 an enlarged cross sectional view showing the II portion of the organic EL device shown in FIG. 1.

FIG. 1 is a schematic cross sectional view showing an organic EL device as a lighting device and the structure of a reflection type liquid crystal device employing the organic EL device as a front light. FIG. 2 is an enlarged cross sectional view showing the II portion of the organic EL device shown in FIG. 1. Hereinafter, the structure of the reflection type liquid crystal device and the organic EL device will be described with reference to FIGS. 1 and 2.

A reflection type liquid crystal device 10 is a device in which a reflection type liquid crystal panel 11 and an organic EL device 12 as a lighting device (front light) to be disposed on the display surface of the liquid crystal panel 11 are combined. Specifically, the reflection type liquid crystal device 10 reflects the outside light (light generated in the organic EL device 12 (front light) described later) emitted from the side of an observer 14 to thereby display color images to the observer 14.

The reflection type liquid crystal panel 11 has an element substrate 15, a counter substrate 16, and a liquid crystal layer 17 held between the element substrate 15 and the counter substrate 16. At the side of the liquid crystal layer 17 (hereinafter referred to as an "upper side" or an "upper layer") of the element substrate 15, TFTs (Thin Film Transistor) 18 and pixel electrodes 19 corresponding to each TFT 18 are regularly formed.

On the upper layer of the pixel electrodes 19, a first oriented film 21 is formed. The liquid crystal layer 17 is held by the first oriented film 21 and a second oriented film 22 described later. Since the reflection type liquid crystal panel 11 is used, the element substrate 15 does not require transparency. Thus, substrates containing opaque materials, such as plastic, can also be used.

The pixel electrodes 19 have reflexibility and reflects light emitted from the side of the liquid crystal layer 17 as a reflected light R toward the liquid crystal layer 17. The reflexibility may be obtained by forming the pixel electrodes 19 themselves with reflective materials or combining the pixel electrodes 19 formed with transparent conductive materials, such as ITO, and a reflective layer containing aluminum or the like.

The TFTs 18 and the pixel electrodes 19 are separated by interlayer insulating films 23 and are electrically connected through contact holes. The TFTs 18 are controlled by a circumference circuit (not shown) and can apply an arbitrary voltage to the corresponding pixel electrodes 19.

The counter substrate 16 is a substrate containing a transparent material, such as glass. The counter substrate 16 is disposed through a seal material (not shown) in parallel to the element substrate 15 in such a manner as to have regular intervals throughout the region. On the surface at the side of the liquid crystal layer 17 of the counter substrate 16, a color filter layer 24, a counter electrode 25, and the second oriented film 22 are disposed in order from the side of the counter substrate 16. On the surface opposite to the liquid crystal layer 17 in the counter substrate 16, a polarizing plate 26 is disposed.

The color filter layer 24 has color filters 24a corresponding to the pixel electrodes 19 as viewed in plan view and light shielding layers (black matrix) 24b formed between the adjacent color filters 24a. The color filter layer 24 of this embodiment has a red color filter, a green color filter, and a blue color filter. The counter electrode 25 contains transparent conductive materials, such as ITO.

Since the reflection type liquid crystal device 10 having such a structure has the organic EL device 12 (front light) disposed on the display surface of the liquid crystal panel 11, the liquid crystal panel 11 can be irradiated with sufficient light. In the front light, the area of the light emitting elements is made small so as not to influence display (since the light emitting elements have a reflective film). Therefore, in order to obtain a given luminance, it is necessary to apply a high current. Hereinafter, the structure of the lighting device (front light: organic EL device 12) having such a structure will be briefly described.

The organic EL device 12 as a lighting device has the structure such that a plurality of light emitting elements 31 are disposed on the surface of the transparent substrate 32 as shown in FIGS. 1 and 2. In detail, the organic EL device 12 has the transparent substrate 32, the light emitting elements 31 disposed on the upper layer (side of the observer 14) of the transparent substrate 32, and a sealing structure 33 provided above the light emitting elements 31.

In detail, as shown in FIG. 2, the light emitting element 31 has an anode 35, a light emitting functional layer 36 provided on the anode 35, and a cathode 37 provided on the light emitting functional layer 36. As the cathode 37, materials having reflective conductivity, such as aluminum (Al), are used. Specifically, EL lights L generated in the light emitting functional layer 36 are emitted toward the liquid crystal panel 11 due to the reflexibility of the cathode 37. Then, by reflection of the EL lights L by each pixel electrode 19, an image to the observer 14 is formed. The region shown in FIG. 2 is a light emitting region, and a transmission region that transmits the reflected light R is provided in the circumference.

The light emitting functional layer 36 has a hole injection layer 41, a hole transporting layer 42, a light emitting layer 43, an electron transporting layer 44, and an electron injection layer 45 in this order from the side of the anode 35.

The hole injection layer 41 has a function of increasing the electron hole pouring efficiency from the anode 35. The hole transporting layer 42 has a function of transporting electron holes, which are poured through the hole injection layer 41 from the anode 35, to the light emitting layer 43.

The light emitting layer 43 is a layer containing an organic light emitting substance that develops an electroluminescence phenomenon. By applying a voltage between the anode 35 and the cathode 37, electron holes are poured from the hole transporting layer 42 into the light emitting layer 43 and electrons are poured from the electron transporting layer 44 into the light emitting layer 43. Then, when the electron holes and electrons are re-combined in the light emitting layer 43, light is emitted. In this embodiment, white light is emitted.

The electron transporting layer 44 has a function of transporting electrons, which are poured from the cathode 37 through the electron injection layer 45, to the light emitting layer 43. The electron injection layer 45 has a function of increasing the electron pouring efficiency from the cathode 37.

Between the light emitting functional layer 36 and the sealing structure 33, a light interference layer 48 containing the cathode 37, a transparent layer 46, and a semi-transmitting reflective layer 47 is provided. The transparent layer 46 contains lithium fluoride (LiF) or the like, for example. The semi-transmitting reflective layer 47 contains aluminum (Al) or the like, for example. The light interference layer 48 reduces reflected outside light.

The reflexibility of the cathode 37 is demonstrated also to ambient light i.e., light, other than the EL light L, emitted from the side of the observer 14. When there is ambient light, the reflected light (reflected light other than the reflected light R by the pixel electrodes 19) by the cathode 37 is emitted to the side of the observer 14 as light other than light forming images. In this embodiment, since the light interference layer 48 is provided at the side of the observer 14 of the light emitting element 31, the reflected light (reflected light other than the reflected light R) from the outside is reduced.

The sealing structure 33 is provided for suppressing permeation of moisture or the like from the outside to protect the light emitting elements 31. As materials of the sealing structure 33, materials having water resistance, such as a silicon oxynitride film (SiON) or a silicon nitride film (SiN), are mentioned. As the sealing structure 33, resin materials may be used, and further a glass substrate or the like may be adhered to the outermost surface.

Structure of Lighting Device

Figure 3:
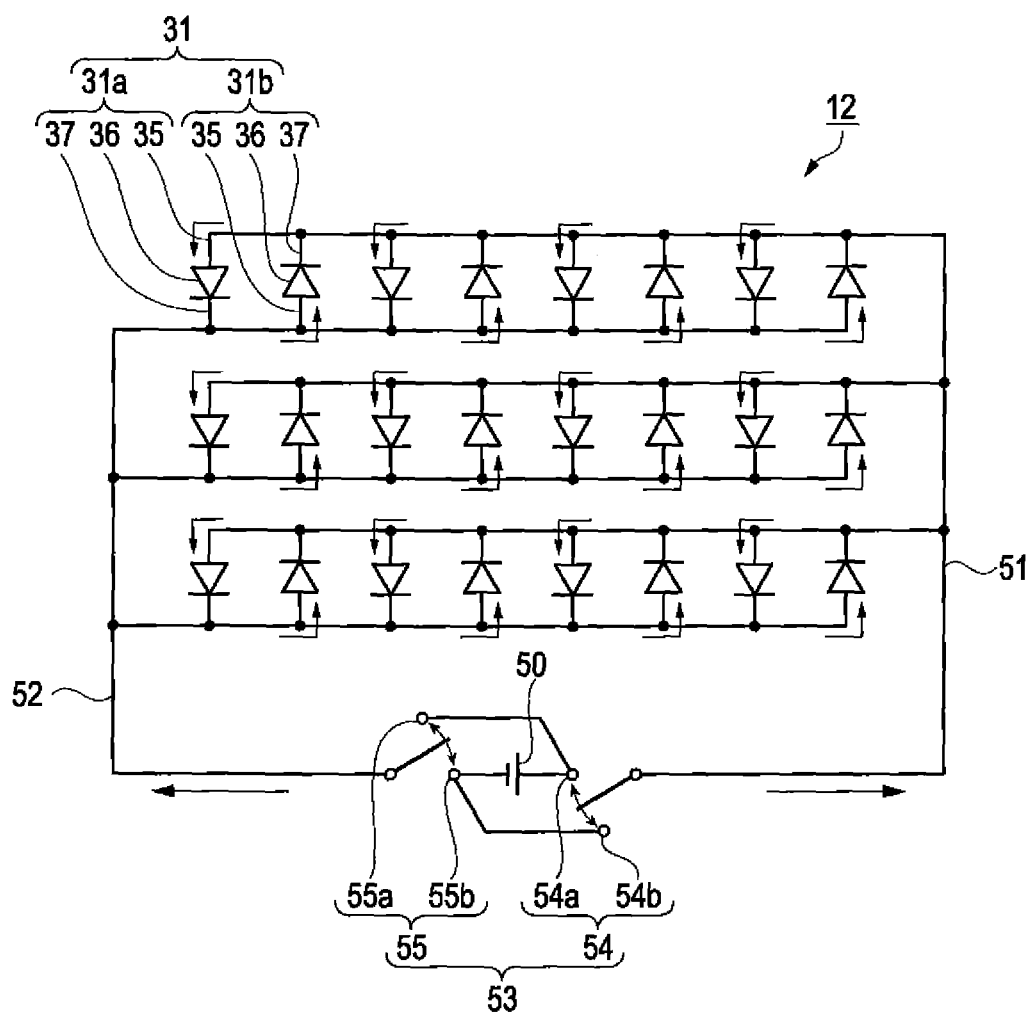
FIG. 3 is an equivalent circuit diagram showing the electrical structure of the organic EL device as a lighting device.
Figure 4:
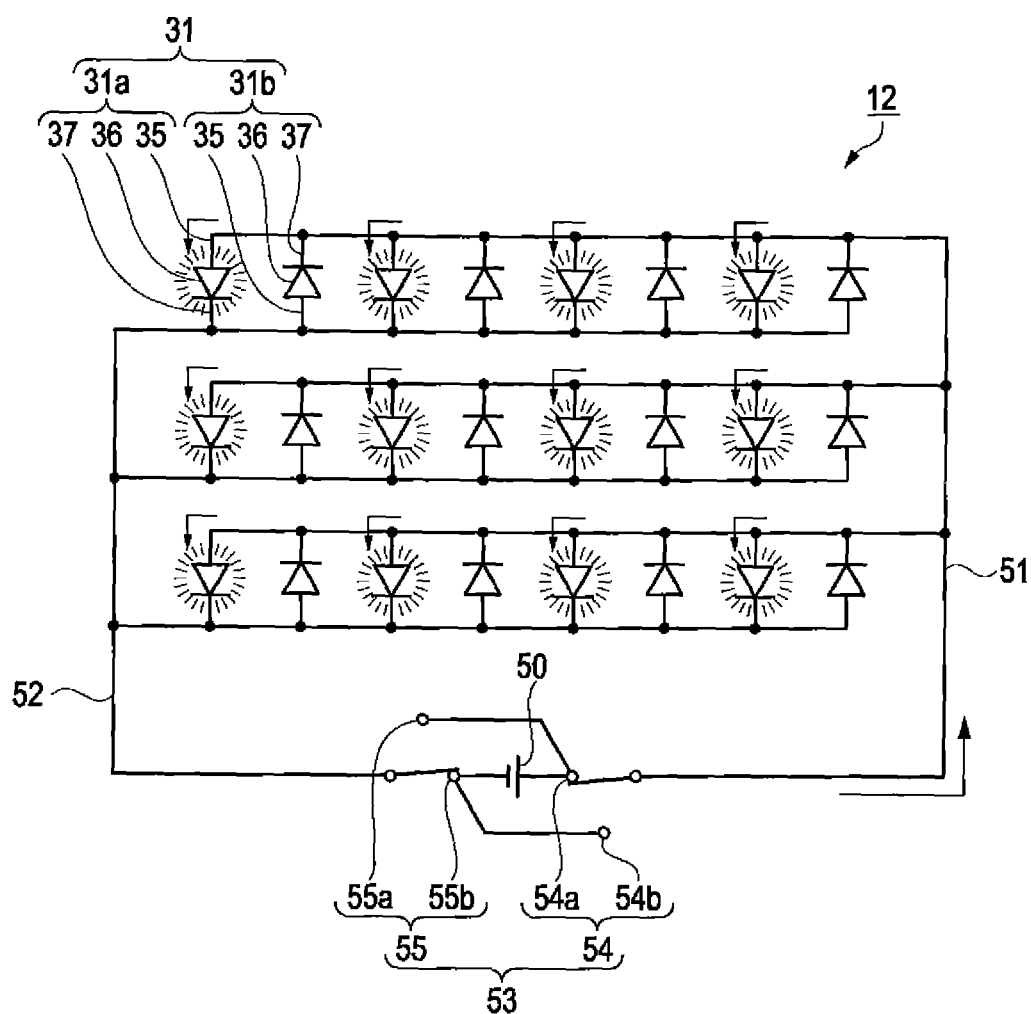
FIG. 4 is an equivalent circuit diagram showing the state of the organic EL device when a current is applied to the side of the first wiring.
Figure 5:
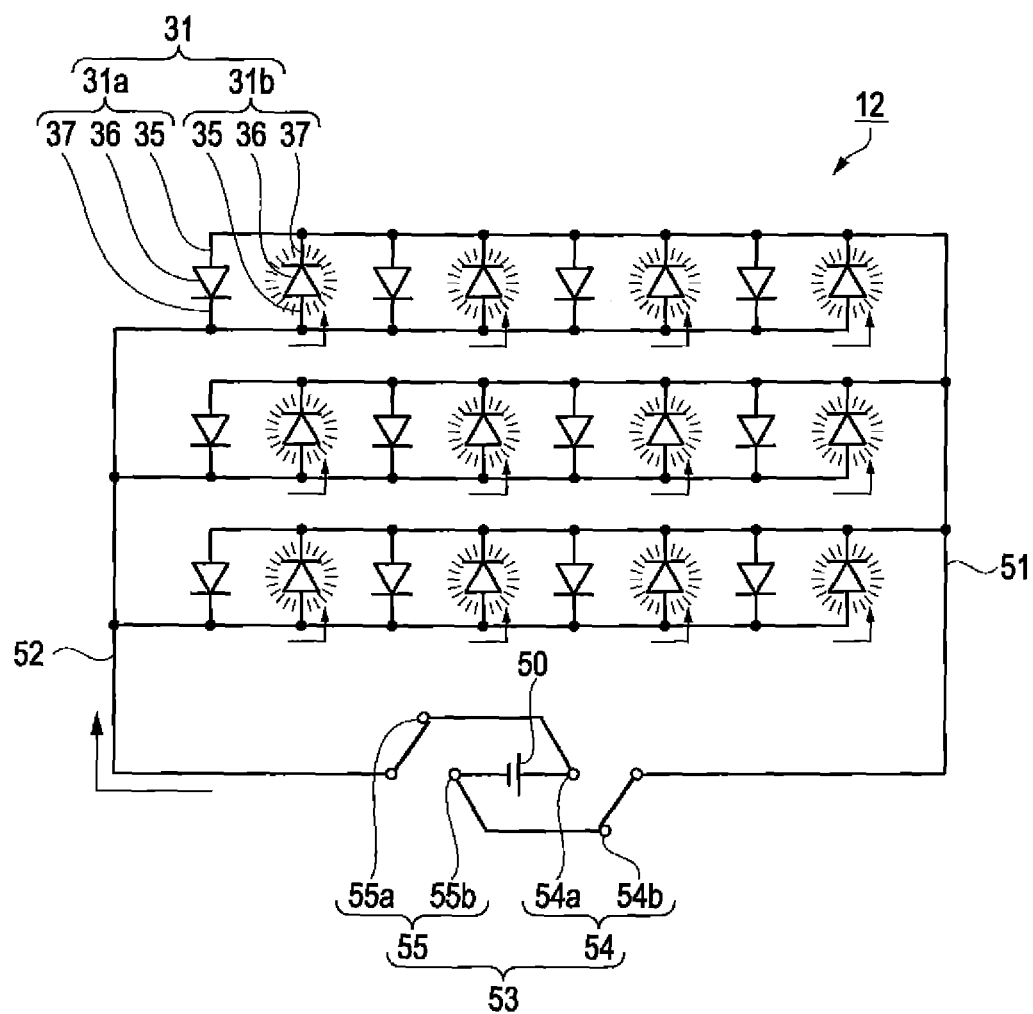
FIG. 5 is an equivalent circuit diagram showing the state of the organic EL device when a current is applied to the side of the second wiring.

FIG. 3 is an equivalent circuit diagram showing the electrical structure of the organic EL device as a lighting device. FIG. 4 is an equivalent circuit diagram showing a state of the organic EL device when a current is applied to the side of a first wiring. FIG. 5 is an equivalent circuit diagram showing a state of the organic EL device when a current is applied to the side of a second wiring. Hereinafter, the structure and operation of the organic EL device will be described with reference to FIGS. 3 to 5.

As shown in FIG. 3, the organic EL device 12 uses a direct-current power supply 50 for supplying a direct-current electrical power as the power supply. The organic EL device 12 has a first wiring 51 connected to one side of the direct-current power supply 50 and a second wiring 52 connected to the other side of the direct-current power supply 50. The first wiring 51 and the second wiring 52 each are branched in a comb shape and are alternately disposed. Between the first wiring 51 and the second wiring 52 that are alternately disposed, a plurality of light emitting elements 31 that emit light by a forward direction current are provided. In other words, the plurality of light emitting elements 31 are connected in parallel.

The plurality of light emitting elements 31 connected in parallel have a first light emitting element 31*a* in which the anode 35 (anode) is connected to the first wiring 51, the cathode 37 (cathode) is connected to the second wiring 52, and the light emitting functional layer 36 is provided between the anode 35 and the cathode 37. Furthermore, the light emitting elements 31 have a second light emitting element 31*b* in which the cathode 37 (cathode) is connected to the first wiring 51, the anode 35 (anode) is connected to the second wiring 52, and the light emitting functional layer 36 is provided between the anode 35 and the cathode 37. The light emitting element 31 can be equivalently considered as a diode.

The first light emitting element 31*a* and the second light emitting element 31*b* are alternately connected. The first light emitting elements 31*a* and the second light emitting element 31*b* adjacent to each other constitute one pixel.

The organic EL device 12 has a switch 53 (54, 55) that switches the current flowing direction (polarity of electrical power). The switch 53 has a first switch 54 and a second switch 55. The first switch 54 has a first anode terminal 54*a* electrically connected to the side of a plus electrode of the direct-current power supply 50 and a first cathode terminal 54*b* electrically connected to the side of a minus electrode of the direct-current power supply 50. The second switch 55 has a second anode terminal 55*a* electrically connected to the side of the plus electrode of the direct-current power supply 50 and a second cathode terminal 55*b* electrically connected to the side of the minus electrode of the direct-current power supply 50.

Next, with reference to FIG. 4, the operation of the organic EL device 12 in which the first wiring 51 is electrically connected to the first anode terminal 54*a* and the second wiring 52 is electrically connected to the second cathode terminal 55*b* will be described. First, when the direct-current power supply 50 is in the ON state, electrical power (electrical power having a positive polarity) is supplied to the first wiring 51 from the direct-current power supply 50, and a current flows to the side of the first wiring 51. Then, the first light emitting elements 31a (connected in a forward direction), in which the first wiring 51 and the anode 35 are electrically connected, among the light emitting elements 31 emit light. The first light emitting elements 31a emit light with a luminance according to the amount of a current to flow to the light emitting functional layer 36. In this case, since the second light emitting elements 31b are connected in a reverse direction, light is not emitted.

In contrast, with reference to FIG. 5, the operation of the organic EL device 12 in which the first wiring 51 is electrically connected to the first cathode terminal 54b and the second wiring 52 is electrically connected to the second anode terminal 55a will be described. First, when the direct-current power supply 50 is in the ON state, electrical power (electrical power having a positive polarity) is supplied to the second wiring 52 from the direct-current power supply 50, and a current flows to the side of the second wiring 52. Then, the second light emitting elements 31b (connected in a reverse direction), in which the second wiring 51 and the anode 35 are electrically connected, among the light emitting elements 31 emit light. The second light emitting elements 31b emit light with a luminance according to the amount of a current to flow to the light emitting functional layer 36. In this case, since the first light emitting elements 31a are connected in a forward direction, light is not emitted.

Thus, switching the connection state of the first switch 54 and the second switch 55 to change the current flowing direction, either the first light emitting element 31a or the second light emitting element 31b that constitute one pixel can be made to emit light.

Figure 6:
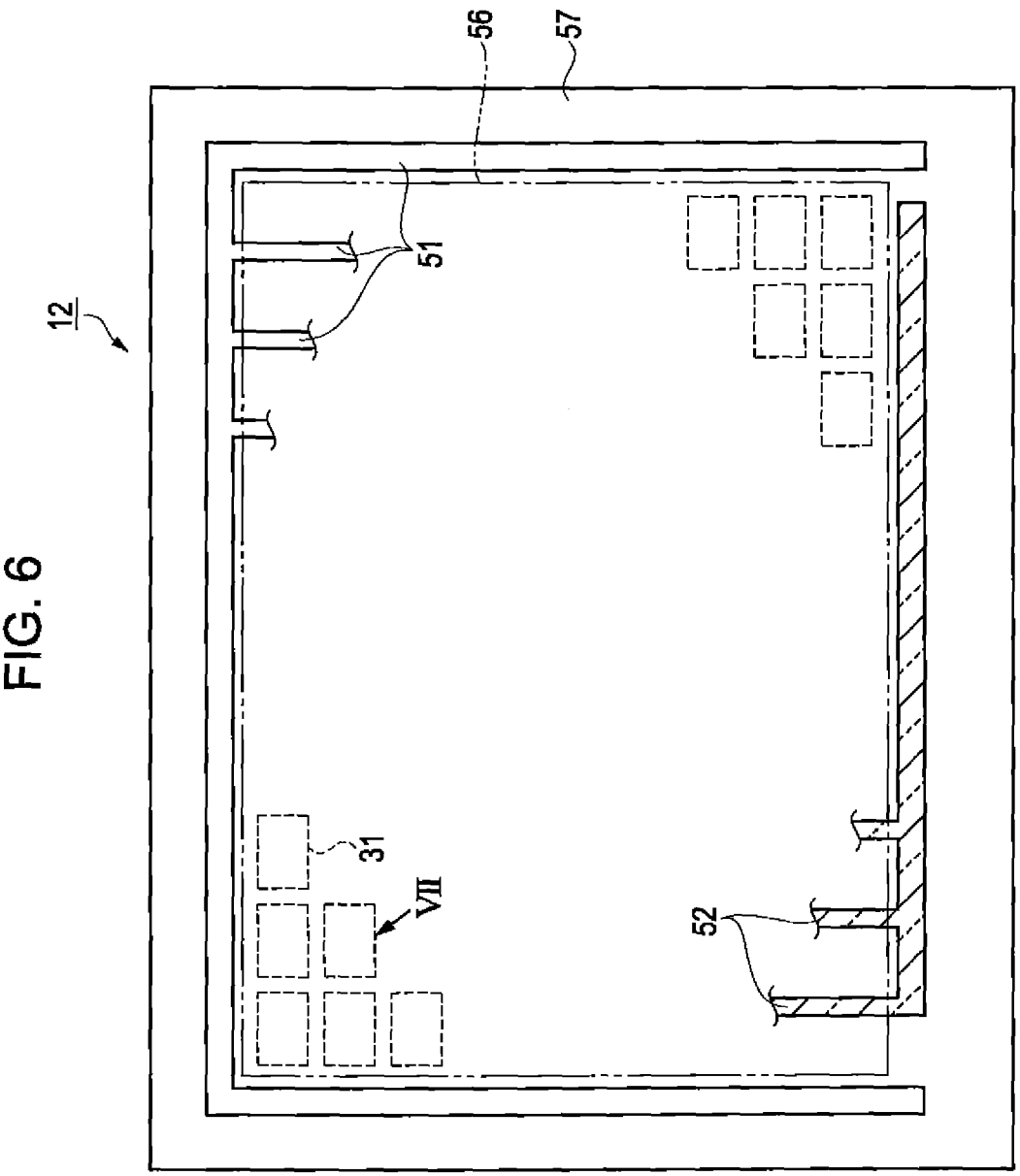
FIG. 6 is a schematic plan view showing the structure of an organic EL device.
Figure 7:
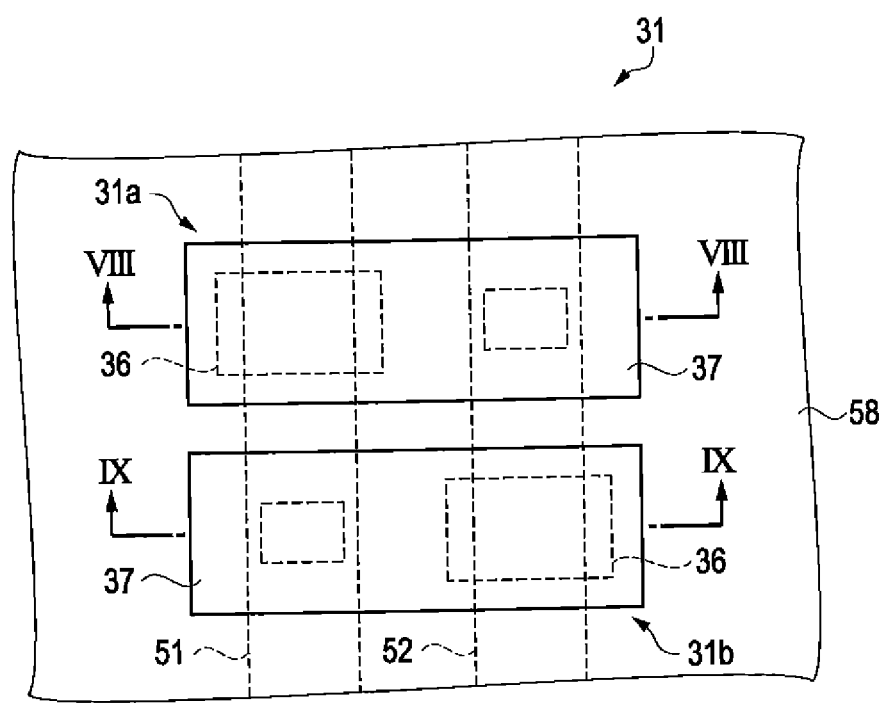
FIG. 7 is an enlarged schematic view showing the VII portion of the organic EL device shown in FIG. 6.
Figure 8:
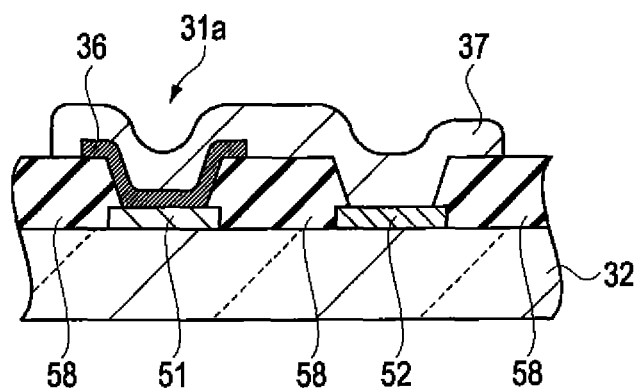
FIG. 8 is a schematic cross sectional view along the line of the organic EL device shown in FIG. 7.
Figure 9:
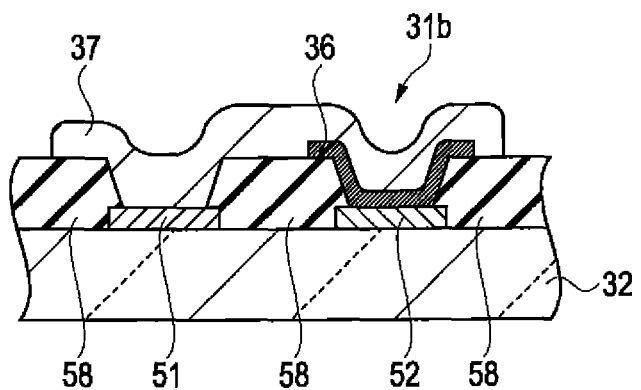
FIG. 9 is a schematic cross sectional view along the IX-IX line of the organic EL device shown in FIG. 7.

FIG. 6 is a schematic plan view showing the structure of an organic EL device. FIG. 7 is an enlarged schematic view showing the VII portion of the organic EL device shown in FIG. 6. FIG. 8 is a schematic cross sectional view along the VIII-VIII line of the organic EL device shown in FIG. 7. FIG. 9 is a schematic cross sectional view along the IX-IX line of the organic EL device shown in FIG. 7. In FIGS. 8 and 9, the light interference layer, the sealing structure, and the like are omitted. Hereinafter, the structure of the organic EL device will be described with reference to FIGS. 6 to 9.

As shown in FIG. 6, the organic EL device 12 has a light emitting region 56 in which the light emitting elements 31 are regularly disposed at a given interval and a surrounding region 57 which is a region surrounding the light emitting region 56.

The light emitting region 56 is a region that emits EL light L to the liquid crystal panel 11, and is a region corresponding to a region in which an image is formed in the liquid crystal panel 11. In the light emitting region 56, the first wirings 51 in a belt shape and the second wirings 52 in a belt shape are disposed alternately and substantially in parallel. Both the first wirings 51 and the second wirings 52 are formed with ITO which is a transparent conductive material and do not affect the visibility of an image to be formed in the liquid crystal panel 11.

As shown in FIGS. 7 to 9, the light emitting element 31 has the first light emitting element 31a in which the light emitting functional layer 36 is formed in a region overlapped with the first wiring 51 as viewed in plan view and the second light emitting element 31b in which the light emitting functional layer 36 is formed in a region overlapped with the second wiring 52 as viewed in plan view.

The light emitting element 31 has a pair of the first light emitting element 31a and the second light emitting element 31b and two or more of the light emitting elements 31 are provided in a first direction in which the first wiring 51 and the second wiring 52 extend and a second direction orthogonal to the first direction (FIG. 6). In other words, the pair of the first light emitting element 31a and the second light emitting element 31b is formed in the shape of a matrix in the light emitting region 56.

In detail, the first light emitting element 31a has the light emitting functional layer 36 in an island shape (pad shape) as viewed in plan view provided on a part of the first wiring 51 on the transparent substrate 32. In the circumference of the light emitting functional layer 36, an insulating film 58 is provided. As shown in FIG. 8, on the light emitting functional layer 36, the cathode 37 containing aluminum (Al) or the like one end of which is electrically connected to the second wiring 52 is provided. The first wiring 51 and the second wiring 52 are electrically insulated by the insulating film 58.

The second light emitting element 31b has the light emitting functional layer 36 in an island shape (pad shape) as viewed in plan view provided on a part of the second wiring 52 on the transparent substrate 32. An insulating film 58 is provided in the circumference of the light emitting functional layer 36. As shown in FIG. 9, on the light emitting functional layer 36, the cathode 37 containing aluminum (Al) or the like one end of which is electrically connected to the first wiring 51 is provided. The first wiring 51 and the second wiring 52 are electrically insulated by the insulating film 58. As shown in FIG. 7, the cathode 37 constituting the first light emitting element 31a and the cathode 37 constituting the second light emitting element 31b are separated through the insulating film 58.

In such a structure, when the first wiring 51 is connected to the plus side of the direct-current power supply 50 and the second wiring 52 is connected to the minus side of the direct-current power supply 50, the first light emitting element 31a emits light. When the second wiring 52 is connected to the plus side of the direct-current power supply 50 and the first wiring 51 is connected to the minus side of the direct-current power supply 50, the second light emitting element 31b emits light.

As described above, the first light emitting element 31a and the second light emitting element 31b alternately emit light by switching the polarity of the first wiring 51 and the second wiring 52 using the switch 53. When used as described above, the life of the organic EL device 12 (front light) can be extended.

In the organic EL device 12 as shown in FIG. 6, the light emitting region 56 is a rectangle and the light emitting elements 31 are regularly disposed in the light emitting region 56, but the invention is not limited to such an aspect. The light emitting region 56 may be a circular shape or the like (including infinite shapes) and the light emitting elements 31 may also be randomly disposed. Hereinafter, a method for manufacturing the organic EL device 12 will be described.

FIGS. 10 to 13 are schematic cross sectional views showing a method for manufacturing an organic EL device in order of processes. In detail, FIGS. 10A, 11A, 12A, and 13A in FIGS. 10 to 13 are schematic cross sectional views showing a manufacturing method focusing on the first light emitting elements constituting the organic EL device in order of processes. FIGS. 10B, 11B, 12B, and 13B in FIGS. 10 to 13 are schematic cross sectional views showing a manufacturing method focusing on the second light emitting elements. Hereinafter, the method for manufacturing an organic EL device (the first light emitting element, the second light emitting element) will be described with reference to FIGS. 10 to 13.

Figure 10A:
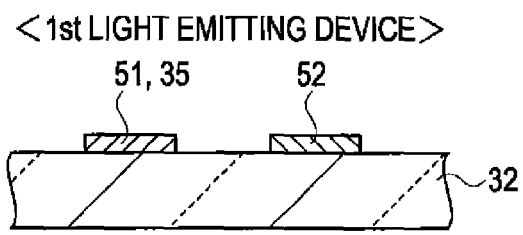
FIGS. 10A and 10B are schematic cross sectional views showing a method for manufacturing an organic EL device in order of processes.
Figure 10B:
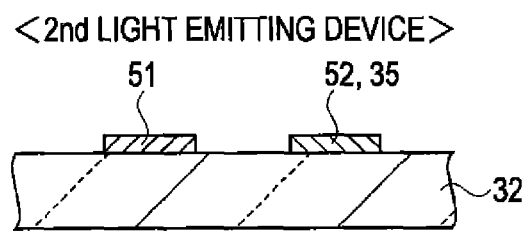

First, as shown in FIGS. 10A and 10B, the first wiring 51 and the second wiring 52 are formed on the transparent substrate 32. As the transparent substrate 32, a glass substrate or the like is mentioned. In the first light emitting element 31a, the first wiring 51 is used as the anode 35. In contrast, in the second light emitting element 31b, the second wiring 52 is used as the anode 35.

The second wiring 52 of the first light emitting element 31a and the first wiring 51 of the second light emitting element 31b are used for connection to the cathode 37. The first wiring 51 and the second wiring 52 contain a metal oxide conductive film having light transmittance properties, such as ITO. The first wiring 51, the second wiring 52, and each layer described below can be successively formed using a known vacuum evaporation method, for example.

Figure 11A:
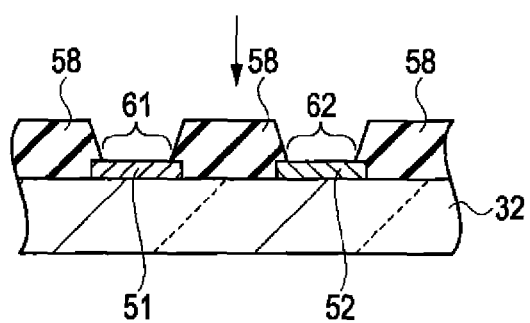
FIGS. 11A and 11B are schematic cross sectional views showing the method for manufacturing an organic EL device in order of processes.
Figure 11B:
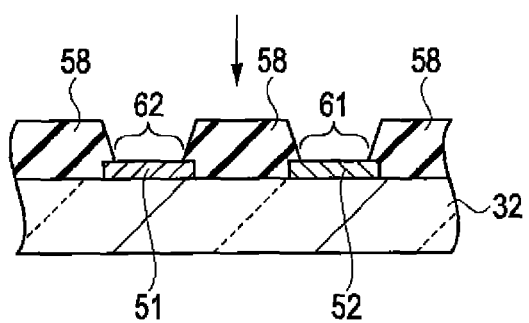

Next, as shown in FIGS. 11A and 11B, an insulating film 58 is formed on the transparent substrate 32 and the wirings (the first wiring 51 and second wiring 52) so that the regions of a light emission portion 61 and a contact portion 62 open. The insulating film 58 is formed with an acrylic resin, a polyimide resin, or the like, for example.

Figure 12A:
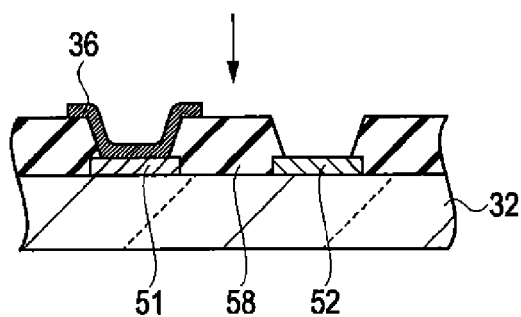
FIGS. 12A and 12B are schematic cross sectional views showing the method for manufacturing an organic EL device in order of processes.
Figure 12B:
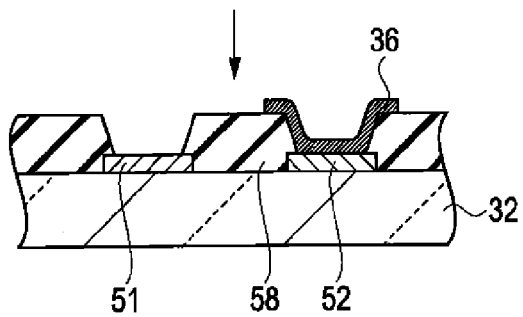

Next, as shown in FIGS. 12A and 123, the light emitting functional layer 36 is formed. In detail, the light emitting functional layer 36 is formed on a part of the first wiring 51 and the insulating film 58 of the first light emitting element 31a and a part of the second wiring 52 and the insulating film 58 of the second light emitting element 31b. In the light emitting functional layer 36, the hole injection layer 41, the hole transporting layer 42, the light emitting layer 43, the electron transporting layer 44, and the electron injection layer 45 are laminated in order as described above (shown in a single layer in FIGS. 12A and 12B).

Figure 13A:
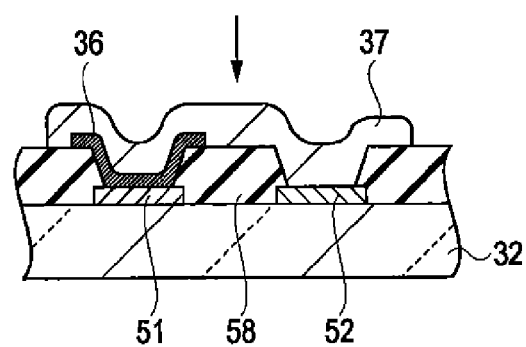
FIGS. 13A and 13B are schematic cross sectional views showing the method for manufacturing an organic EL device in order of processes.
Figure 13B:
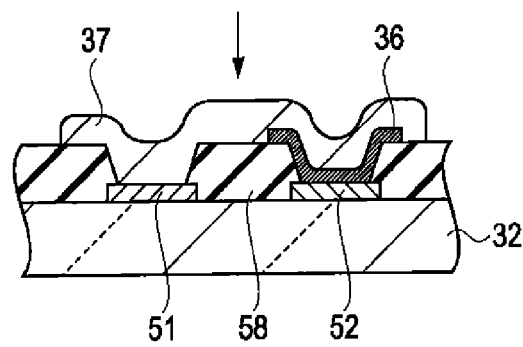

Next, as shown in FIGS. 13A and 13B, the cathode 37 is formed. Specifically, in the first light emitting element 31a, the cathode 37 is formed on the light emitting functional layer 36, the second wiring 52, and the insulating film 58. In the second light emitting element 31b, the cathode 37 is formed on the first wiring 51, the light emitting functional layer 36, and the insulating film 58. As described above, the cathode 37 on the first light emitting element 31a and the cathode 37 on the second light emitting element 31b are separately formed in such a manner as not to be electrically connected (FIG. 7).

By forming as described above, when a current is applied to the side of the first wiring 51, the current flows to the second wiring 52 from the first wiring 51, and then the first light emitting element 31a emits light as described above. When a current is applied to the side of the second wiring 52, the current flows to the first wiring 51 from the second wiring 52, and then the second light emitting element 31b emits light.

Since the first wiring 51, the second wiring 52, and the other respective layers can be formed in the same process, the processes therefor can be reduced and the first light emitting element 31a and the second light emitting element 31b having no difference in the polarity can be formed.

As described in detail above, according to the first embodiment, the following effect described below can be obtained.

(1) According to the first embodiment, the first light emitting elements 31a and the second light emitting elements 31b are connected in parallel, and when a current is applied to the side of the first wiring 51, the first light emitting elements 31a emit light and when a current is applied to the side of the second wiring 52, the second light emitting elements 31b emit light. Then, by switching the current flowing direction using the switch 53 (54, 55), the first light emitting elements 31a and the second light emitting elements 31b can be made to alternately emit light. While one kind of the light emitting elements emit light, the other kind of the light emitting elements do not emit light. Thus, the other kind of the light emitting elements can be cooled. As a result, deterioration due to that the temperature of the light emitting elements 31a and 31b become high is suppressed to delay the time when the luminance decreases (display quality deteriorates) compared with the case where only one light emitting element is made to continuously emit light, and thus the life can be extended. By making one kind of the light emitting elements (e.g., first light emitting elements 31a) continuously emit light until the luminance thereof decreases to a low threshold luminance, and then switching to the other kind of the light emitting elements (e.g., second light emitting elements 31b) and making the other kind of the light emitting elements continuously emit light, the light emitting period of time can be extended compared with the case where only one emitting light is made to continuously emit light. As a result, the life of the lighting device can be extended.

(2) According to the first embodiment, since the first light emitting elements 31a and the second light emitting elements 31b are alternately connected, the interval between the first light emitting element 31a and the adjacent first light emitting element 31a or the second light emitting element 31b and the adjacent second light emitting element 31b can be made substantially uniform. Therefore, light emission by the first light emitting elements 31a or light emission by the second light emitting elements 31b can be performed with a good balance in the light emitting region 56. Therefore, light can be uniformly emitted from the entire organic EL device 12 (lighting device).

(3) According to the first embodiment, the plurality of first light emitting elements 31a and the plurality of second light emitting elements 31b are connected in parallel. Thus, even when problems arise in one kind of the light emitting elements, light can be made to emit using the other kind of the light emitting elements.

(4) According to the first embodiment, when the film is formed by a vapor-deposition method, for example, the first light emitting elements 31a and the second light emitting elements 31b can be formed simply by changing a vapor deposition range and can be formed in the same and one process. Thus, the elements can be relatively easily formed.

Second embodiment

Structure of Lighting Device

Figure 14:
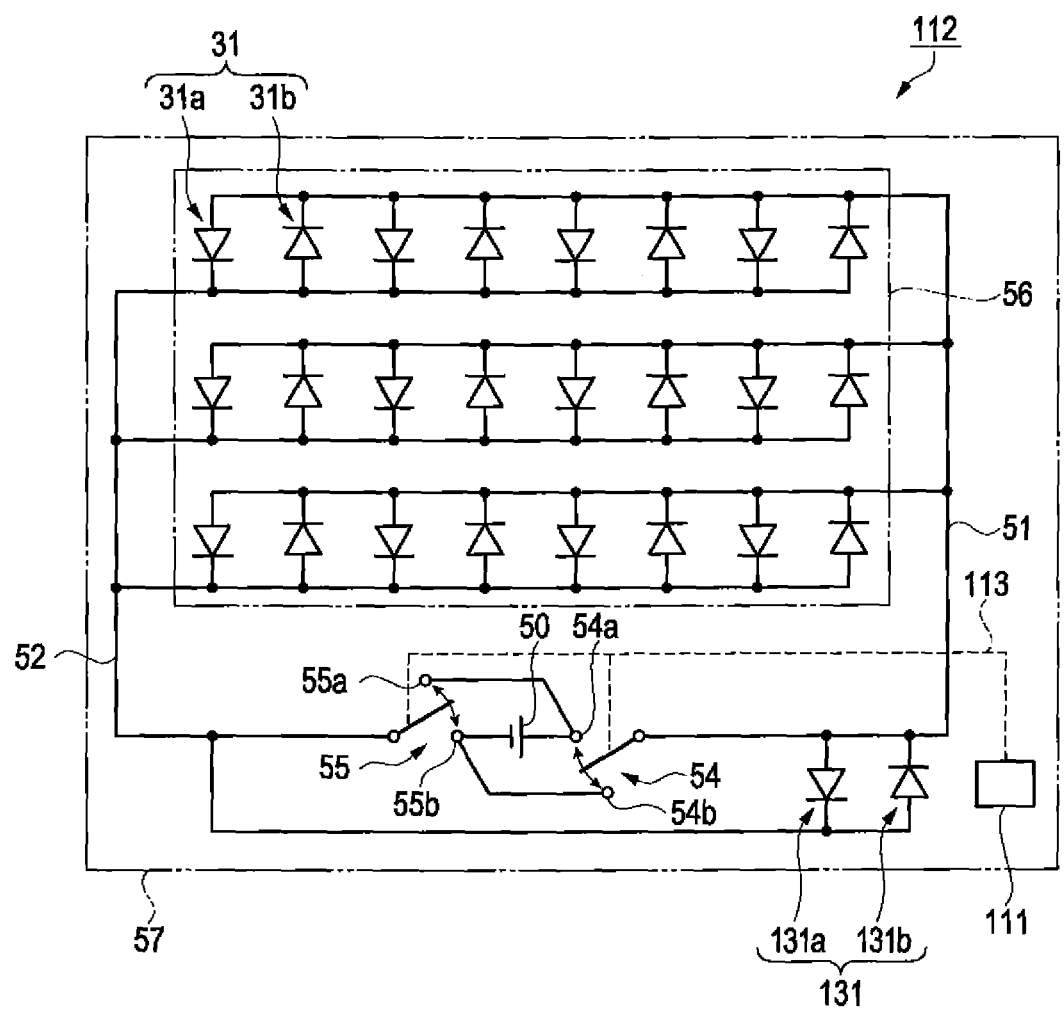
FIG. 14 is an equivalent circuit diagram showing the electrical structure of an organic EL device as a lighting device of a second embodiment.

FIG. 14 is an equivalent circuit diagram showing the electrical structure of an organic EL device as a lighting device of a second embodiment. Hereinafter, the structure of the organic EL device will be described with reference to FIG. 14.

An organic EL device 112 of a second embodiment is different from that of the first embodiment in that a light emitting element for detection 131 and a detector (optical sensor 111) for detecting the luminance of the first light emitting elements 31a and the second light emitting elements 31b are provided. Hereinafter, the same constituent members as those of the first embodiment are designated by the same reference numerals, and the description thereof will be omitted or simplified here.

As shown in FIG. 14, the organic EL device 112 of the second embodiment has the first wiring 51 connected to one side of the direct-current power supply 50 and the second wiring 52 connected to the other side of the direct-current power supply 50 similarly as in the first embodiment, in which the first wiring 51 and the second wiring 52 that are branched into a plurality of wiring lines are alternately disposed and the first light emitting elements 31a and the second light emitting elements 31b are connected thereto in parallel. Similarly as in the first embodiment, the first switch 54 and the second switch 55 are provided, so that the current flowing direction can be switched.

In such an organic EL device 112, the light emitting element for detection 131 to be used for detecting the luminance is provided between the first wiring 51 and the second wiring 52 as a characteristic portion of the second embodiment. The light emitting element for detection 131 has a first light emitting element for detection 131*a* that emits light when a current flows to the side of the first wiring 51 and a second light emitting element for detection 131*b* that emits light when a current flows to the side of the second wiring 52. More specifically, when the first light emitting element 31*a* provided in the light emitting region 56 is made to emit light, the first light emitting element for detection 131*a* also simultaneously emits light. In contrast, when the second light emitting element 31*b* provided in the light emitting region 56 is made to emit light, the second light emitting element for detection 131*b* also simultaneously emits light.

An optical sensor 111 as a detector that is adjacent to the two light emitting elements for detection 131*a* and 131*b* (131) and detects luminance. As the optical sensor 111, photodiodes, phototransistors, and CSDs can be used, for example. Thus, by detecting luminance through the light emitting element for detection 131, the luminance of the first light emitting elements 31*a* and the second light emitting elements 31*b* can be detected. According to the luminance detection results by the optical sensor 111 (e.g., when the luminance decreases to a lower threshold value), the connection state of the first switch 54 and the second switch 55 is switched.

Specifically, the operation when the first wiring 51 is electrically connected to the first anode terminal 54*a* and the second wiring 52 is electrically connected to the second cathode terminal 55*b* will be first described. When the direct-current power supply 50 is in the ON state, a current flows to the side of the first wiring 51, and then the first light emitting elements 31*a* emit light, and simultaneously therewith the first light emitting element for detection 131*a* emits light. At this time, the optical sensor 111 detects the luminance of the first light emitting element for detection 131*a*. Then, when the luminance reaches a lower threshold value (when the luminance decreases to a given luminance), light emission is switched to the light emission by the second light emitting elements 31*b* from the light emission by the first light emitting elements 31*a*.

Next, the operation when the first wiring 51 is electrically connected to the first cathode terminal 54*b* and the second wiring 52 is electrically connected to the second anode terminal 55*a* will be described. When the direct-current power supply 50 is in the ON state, a current flows to the side of the second wiring 52, and then the second light emitting elements 31*b* emit light, and simultaneously therewith the second light emitting element for detection 131*b* emits light. At this time, the optical sensor 111 detects the luminance of the second light emitting element for detection 131*b*. Then, when the luminance reaches a lower threshold value, the organic EL device 112 is replaced by a new organic EL device 112, for example.

It is preferable to provide a switch mechanism 113 for switching the connection state of the first switch 54 and the second switch 55 according to the detection value of the optical sensor 111. Specifically, the switch mechanism 113 is provided so that the optical sensor 111 and the first switch 54 and the second switch 55 are linked through the switch mechanism 113.

Specifically, the first light emitting elements 31*a* are first made to emit light. Then, by sending a signal to the switch mechanism 113 when the optical sensor 111 judges that the luminance of the first light emitting element for detection 131*a* decreases to a lower threshold luminance, the connection state of the first switch 54 and the second switch 55 is changed, whereby light emission is switched from the light emission by the first light emitting elements 31*a* to the light emission by the second light emitting elements 31*b*. Thus, the light emission can be automatically switched without reducing the luminance to be lower than the lower threshold value.

The light emitting element for detection 131 is preferably provided in the surrounding region 57 outside the light emitting region 56 of the organic EL device 112. Since the optical sensor 111 is not disposed in the light emitting region 56, the luminance can be detected without reducing luminance required for the light emitting region 56. Since the first light emitting element for detection 131*a* and the second light emitting element for detection 131*b* corresponding to the two light emitting elements 31*a* and 31*b* (light emitting element 31) are provided in the surrounding region 57, it can be judged that which one of the light emitting element 31*a*, 31*b* (31) emits light by confirming the lighting condition of the two light emitting elements for detection.

As described in detail above, according to the second embodiment, the following effects can be obtained in addition to the effects of (1) to (4) of the first embodiment described above.

(5) According to the second embodiment, the optical sensor 111 is provided. Thus, the luminance of the first light emitting elements 31*a* and the second light emitting elements 31*b* can be confirmed. Thus, compared with a method for visually judging the luminance and switching the light emitting elements, it becomes possible to accurately switch the light emitting elements from one kind of the light emitting elements to the other kind of the light emitting elements. Furthermore, since the optical sensor 111 detects the luminance, light can be made to always emit with a luminance higher than the lower threshold luminance.

(6) According to the second embodiment, the luminance is detected using the light emitting elements for detection 131*a* and 131*b*. Thus, for example, by providing the light emitting elements for detection 131*a* and 131*b* in the surrounding region 57 outside the light emitting region 56, the luminance of the light emitting elements 31*a* and 31*b* can be detected without reducing a luminance required for the light emitting region 56.

Third Embodiment

Structure of Lighting Device

Figure 15:
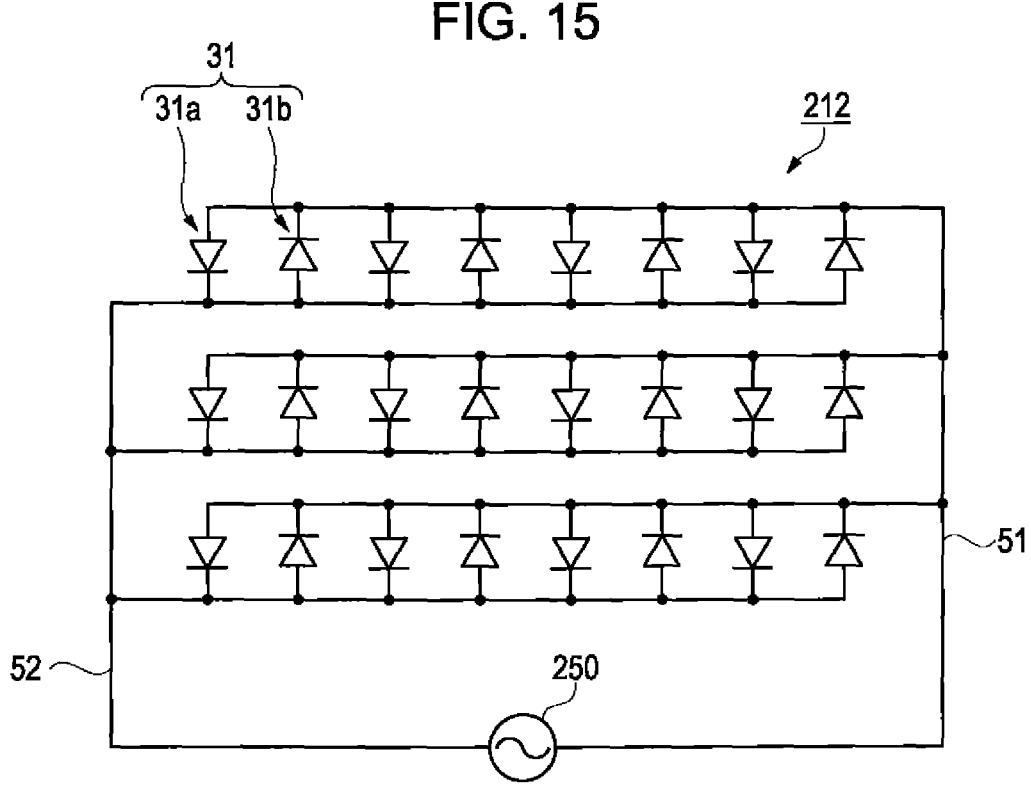
FIG. 15 is an equivalent circuit diagram showing the electrical structure of an organic EL device as a lighting device of a third embodiment.
Figure 16:
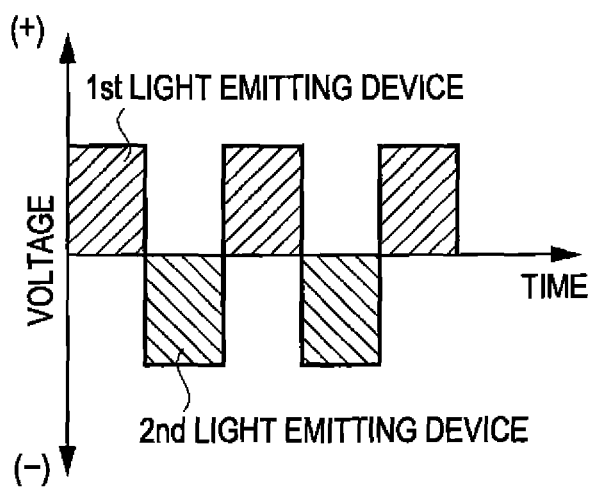
FIG. 16 is a waveform diagram showing the waveform of a voltage to be applied to an organic EL device.

FIG. 15 is an equivalent circuit diagram showing the electrical structure of an organic EL device as a lighting device of a third embodiment. FIG. 16 is a waveform diagram showing the waveform of a voltage to be applied to the organic EL device. Hereinafter, the structure of the organic EL device will be described with reference to FIGS. 15 and 16.

An organic EL device 212 of the third embodiment is different from that of the first embodiment in that an alternating-current power supply 250 that supplies an alternating-current power is used as the power supply. Hereinafter, the same constituent members as those of the first embodiment are designated by the same reference numerals, and the description thereof will be omitted or simplified here.

As shown in FIG. 15, the organic EL device 212 of the third embodiment has the first wiring 51 connected to one side of the alternating-current power supply 250 and the second wiring 52 connected to the other side of the alternating-current power supply 250, in which the first wiring 51 and the second wiring 52 that are branched into a plurality of wiring lines are alternately disposed and the first light emitting elements 31a and the second light emitting elements 31b are connected thereto in parallel.

As shown in FIG. 16, with respect to the relationship between the voltage and the time when the alternating-current power supply 250 is used, a positive voltage and a minus voltage are alternately switched with the progress of time. For example, in the case of a positive voltage, a current flows to the side of the first wiring 51, and then the first light emitting elements 31a emit light. In contrast, in the case of a minus voltage, a current flows to the side of the second wiring 52, and then the second light emitting elements 31b emit light.

Thus, by making the first light emitting elements 31a and the second light emitting elements 31b alternately emit light (driving), while one kind of the light emitting elements (e.g., first light emitting elements 31a) emit light and generate heat, the other kind of the light emitting elements (e.g., second light emitting elements 31b) are cooled.

Thus, an increase in the temperature of the first light emitting elements 31a and the second light emitting elements 31b can be suppressed, and deterioration of the light emitting elements 31 can be suppressed. As a result, the period of time while light is emitted with a luminance higher than a lower threshold value can be extended. The timing for switching the first light emitting elements 31a and the second light emitting elements 31b is preferably set to the optimal balance by, for example, adjusting the frequency of the alternating-current power supply 250 while confirming an increase in the temperature of the light emitting elements 31.

As described in detail above, according to the third embodiment, the following effect can be obtained in addition to the effects of (1) to (4) of the first embodiment described above.

(7) According to the third embodiment, the first light emitting elements 31a and the second light emitting elements 31b are connected to each other in parallel and further connected to the alternating-current power supply 250. Thus, when a current flows to the side of the first wiring 51, the first light emitting elements 31a emit light, and when a current flows to the side of the second wiring 52, the second light emitting elements 31b emit light. Based on the fact that the direction of the current to be applied by the alternating-current power supply 250 alternately switches as described above, the first light emitting elements 31a and the second light emitting elements 31b can be made to alternately emit light. Thus, the time when the luminance decreases (display quality deteriorates) can be delayed compared with the case where only one light emitting element is made to continuously emit light. As a result, the life of the organic EL device 212 (lighting device) can be extended. In addition, even when the switch 53 is not used, the first light emitting elements 31a and the second light emitting elements 31b can be made to alternately emit light.

Fourth Embodiment

Structure of Lighting Device

Figure 17:
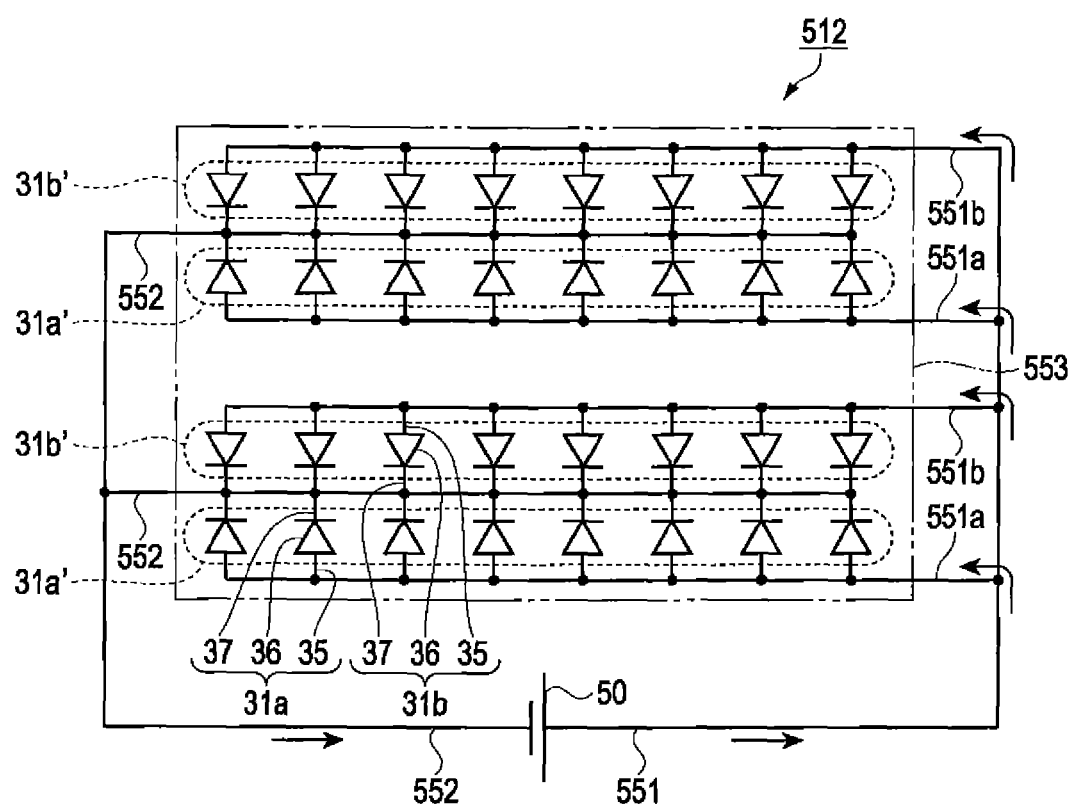
FIG. 17 is an equivalent circuit diagram showing the electrical structure of an organic EL device as a lighting device of a fourth embodiment.

FIG. 17 is an equivalent circuit diagram showing the electrical structure of an organic EL device as a lighting device. Hereinafter, the structure of the organic EL device will be described with reference to FIG. 17.

As shown in FIG. 17, an organic EL device 512 employs the direct-current power supply 50 that supplies direct-current electrical power as the power supply. The organic EL device 512 has an anode wiring 551 connected to the anode of the direct-current power supply 50 and a cathode wiring 552 connected to the cathode of the direct-current power supply 50. The anode wiring 551 is branched to a first anode wiring 551a and a second anode wiring 551b. The cathode wiring 552 is branched to a plurality of cathode wiring lines 552 (common cathode wiring).

Between the first anode wiring 551a and the cathode wiring 552, a plurality of first light emitting elements 31a that are connected in parallel and emit light by a forward direction current are provided. These first light emitting elements 31a are referred to as a first light emitting element group 31a'. Between the second anode wiring 551b and the cathode wiring 552, a plurality of second light emitting elements 31a that are connected in parallel and emit light by a forward direction current are provided. These second light emitting elements 31b are referred to as a second light emitting element group 31b'. The first light emitting element group 31a' and the second light emitting element group 31b' are referred to as a light emitting unit. The first light emitting element 31a and the second light emitting element 31b can be equivalently considered as diodes.

In detail, in the plurality of first light emitting elements 31a that are connected in parallel, the anodes 35 (anode: first terminal) are connected to the first anode wiring 551a and the cathodes 37 (cathode: second terminal) are connected to the cathode wiring 552, and the light emitting functional layers 36 are provided between the anodes 35 and the cathodes 37. In the plurality of second light emitting elements 31b that are connected in parallel, the anodes 35 (anode) are connected to the second anode wiring 551b and the cathodes 37 (cathode) are connected to the cathode wiring 552, and the light emitting functional layers 36 are provided between the anodes 35 and the cathodes 37.

The first light emitting element groups 31a' and the second light emitting element groups 31b' are alternately disposed in the light emitting region 553. Thus, the first light emitting element groups 31a' and the second light emitting element groups 31b' are connected by the two anode wirings 551a and 551b and the single cathode wiring 552. More specifically, the cathode wiring 552 is commonly used in the first light emitting element groups 31a' and second light emitting element groups 31b'.

Next, the operation of the organic EL device 512 will be described with reference to FIG. 17. First, when the direct-current power supply 50 is in the ON state, electrical power (electrical power having a positive polarity) is supplied to the anode wiring 551 from the direct-current power supply 50. Then, the first light emitting elements 31a and the second light emitting element 31b that are connected in a forward direction through the first anode wirings 551a and the second anode wirings 551b emit light. The first light emitting elements 31a and the second light emitting elements 31b emit light with luminance according to the amount of a current flowing to the light emitting functional layers 36.

Figure 18:
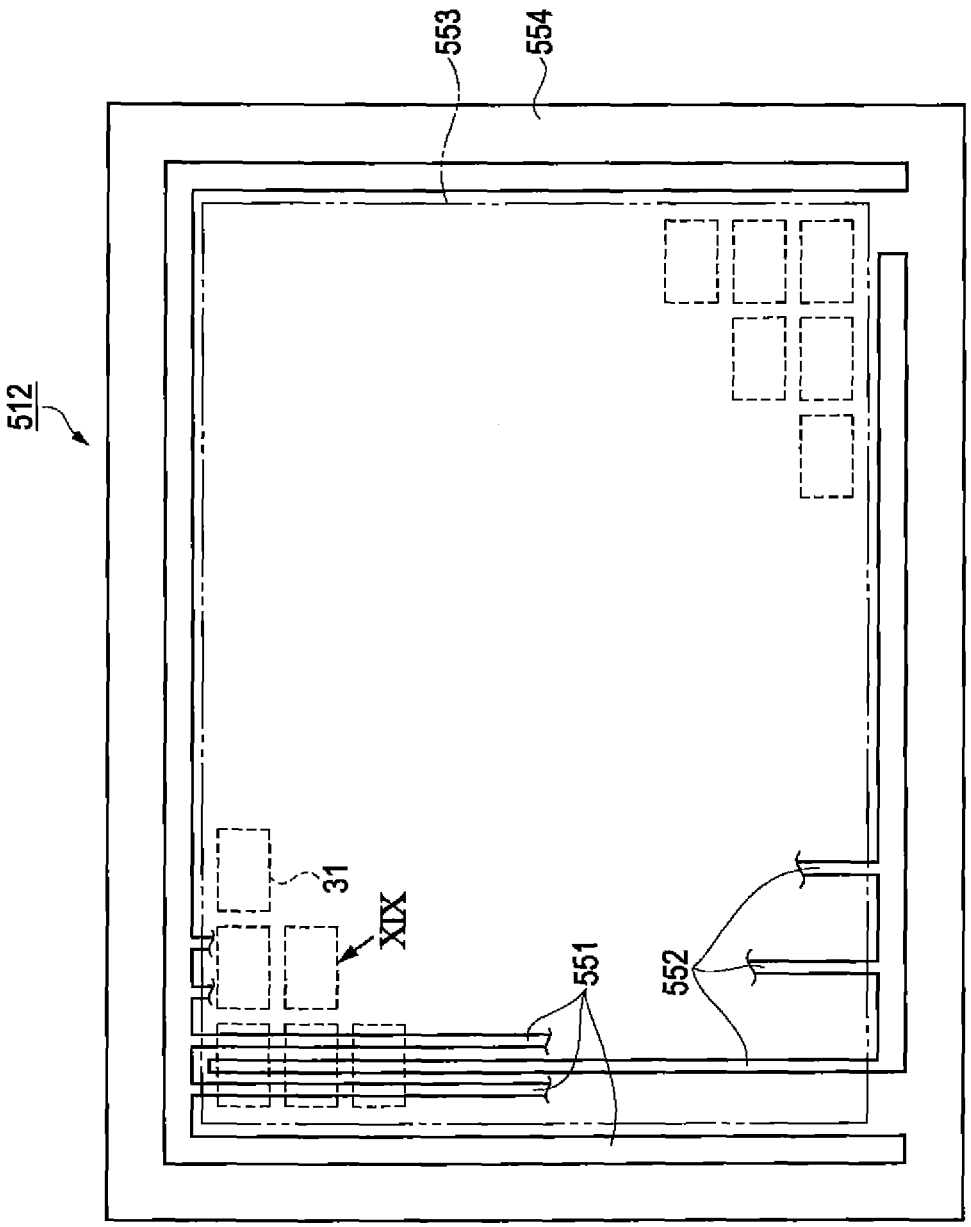
FIG. 18 is a schematic plan view showing the structure of the organic EL device.
Figure 19:
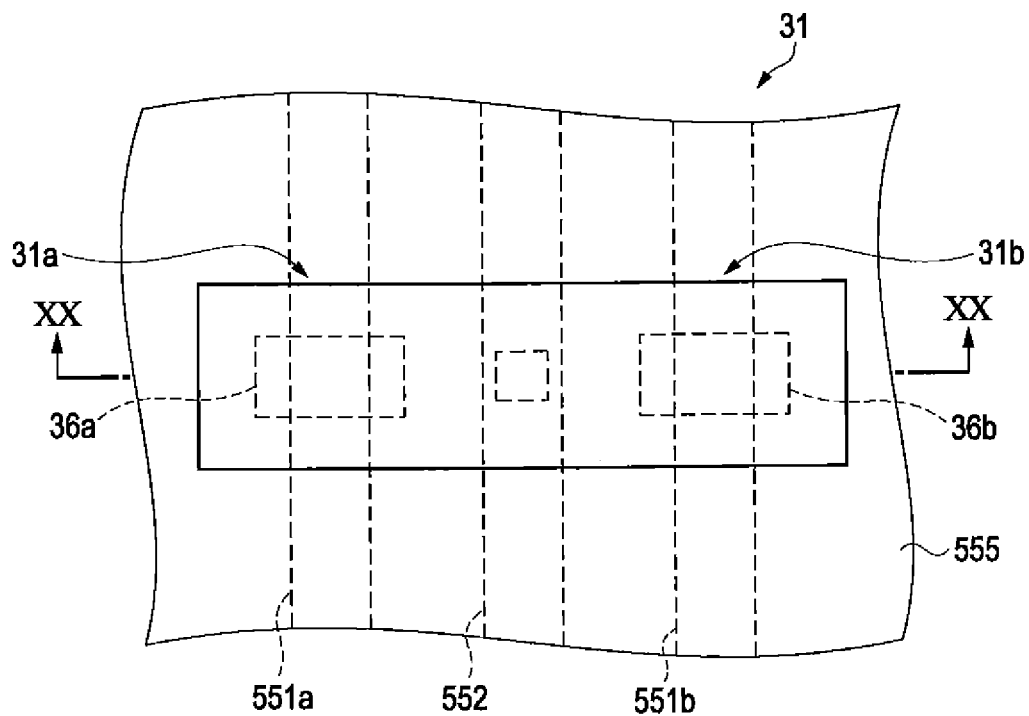
FIG. 19 is an enlarged schematic view showing the XIX portion of the organic EL device shown in FIG. 18.
Figure 20:
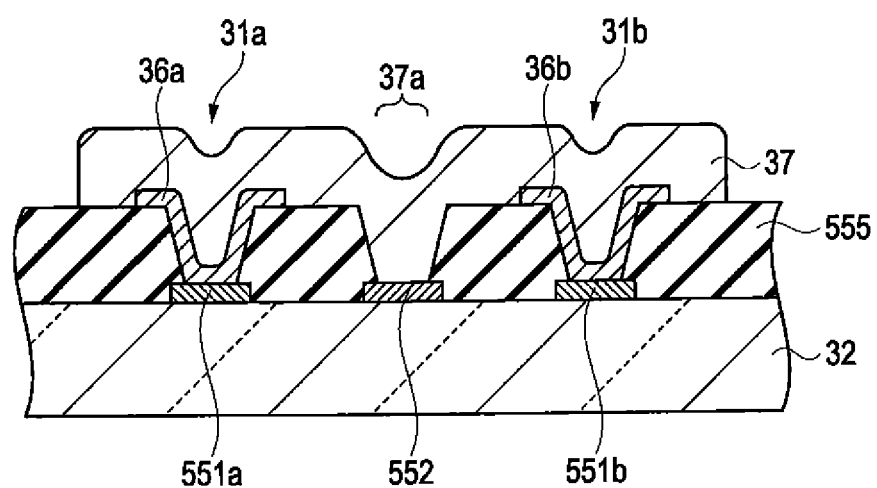
FIG. 20 is a schematic cross sectional view along the XX-XX line of the organic EL device shown in FIG. 19.

FIG. 18 is a schematic plan view showing the structure of an organic EL device. FIG. 19 is an enlarged schematic view showing the XIX portion of the organic EL device shown in FIG. 18. FIG. 20 is a schematic cross sectional view along the XX-XX line of the organic EL device shown in FIG. 19. In FIG. 19, the light interference layer, the sealing structure, and the like are omitted. Hereinafter, the structure of the organic EL device will be described with reference to FIGS. 18 to 20.

As shown in FIG. 18, the organic EL device 512 has a light emitting region 553 in which the light emitting elements 31 are regularly disposed at a given interval and a surrounding region 554 which is a region surrounding the light emitting region 553.

The light emitting region 553 is a region in which the EL light L is emitted to the liquid crystal panel 11 and is a region corresponding to a region in which an image is formed in the liquid crystal panel 11. In the light emitting region 553, the anode wirings 551 in a belt shape and the cathode wirings 552 in a belt shape are disposed substantially in parallel.

Specifically, the first anode wirings 551a and the second anode wirings 551b are disposed at both side of the cathode wiring 552 to be commonly used. Both the anode wirings 551 and the cathode wirings 552 are formed with ITO which is a transparent conductive material and do not affect the visibility of an image to be formed in the liquid crystal panel 11.

As shown in FIGS. 19 and 20, the light emitting element 31 has the first light emitting element 31a in which a light emitting functional layer 36a is formed in a region overlapped with the first anode wiring 551a as viewed in plan view and the second light emitting element 31b in which a light emitting functional layer 36b is formed in a region overlapped with the second anode wiring 551b as viewed in plan view.

The light emitting element 31 has a pair of the first light emitting element 31a and the second light emitting element 31b and two or more of the light emitting elements 31 are provided in a first direction in which the first anode wiring 551a, the second anode wiring 551b, and the cathode wiring 552 extend and in a second direction orthogonal to the first direction (FIG. 18). In other words, a pair of the first light emitting element 31a and the second light emitting element 31b is provided in the shape of a matrix in the light emitting region 553.

In detail, the first light emitting element 31a has the light emitting functional layer 36a in an island shape (pad shape) as viewed in plan view provided on a part of the first anode wiring 551a on the transparent substrate 32. In the circumference of the light emitting functional layer 36a, an insulating film 555 is provided. In contrast, the second light emitting element 31b has the light emitting functional layer 36b in an island shape (pad shape) as viewed in plan view provided on a part of the second anode wiring 551b on the transparent substrate 32. In the circumference of the light emitting functional layer 36b, an insulating film 58 is provided.

As shown in FIG. 20, on a region ranging from the light emitting functional layer 36a to the light emitting functional layer 36b, the cathode 37 containing aluminum (Al) or the like that is electrically connected to the cathode wiring 552 is provided. The first anode wiring 551a, the cathode wiring 552, and the second anode wiring 551b are electrically insulated by the insulating film 555. Thus, a pair of the first light emitting element 31a and the second light emitting element 31b uses the cathode 37 (cathode wiring 552) in common.

In such a structure, the anode wiring 551 (the first anode wiring 551a and the second anode wiring 551b) is connected to the plus side of the direct-current power supply 50 and the cathode wiring 552 is connected to the minus side of the direct-current power supply 50. Thus, when the direct-current power supply 50 is in the ON state, electrical power (electrical power having a positive polarity) is supplied to the anode wiring 551 from the direct-current power supply 50, and then a current flows to the side of the cathode wiring 552 from the side of the anode wiring 551 (the first anode wiring 551a and the second anode wiring 551b). Then, the first light emitting elements 31a and the second light emitting elements 31b that are connected in a forward direction emit light.

As described above, in the first light emitting elements 31a and the second light emitting elements 31b, a region of a portion in which the cathode 37 contacts the cathode wiring 552 is commonly used (common region 37a), the region of the cathode 37 occupying the light emitting region 553 can be made small compared with a former structure such that the first light emitting element 31a and the second light emitting element 31b use separate cathode wirings 552. Thus, the opening ratio can be increased to thereby reduce the amount of a current for obtaining a required quantity of light. Therefore, the light emitting elements 31 are inhibited from having a high temperature to thereby suppress deterioration of the light emitting elements 31. As a result, the life of the organic EL device 512 (front light) can be extended.

In the organic EL device 512 as shown in FIG. 18, the light emitting region 553 is a rectangle and the light emitting elements 31 are regularly disposed in the light emitting region 553, but the invention is not limited to such an aspect. The light emitting region 553 may be a circular shape or the like (including infinite shapes) and the light emitting elements 31 may also be randomly disposed. Hereinafter, a method for manufacturing the organic EL device 512 will be described.

FIGS. 21 to 24 are schematic cross sectional views showing a method for manufacturing an organic EL device in order of processes. In detail, FIGS. 21 to 24 are schematic cross sectional views showing a method for manufacturing an organic EL device in order of processes focusing on the first light emitting elements and the second light emitting elements constituting the organic EL device. Hereinafter, the method for manufacturing an organic EL device (the first light emitting element and the second light emitting element) will be described with reference to FIGS. 21 to 24.

Figure 21:
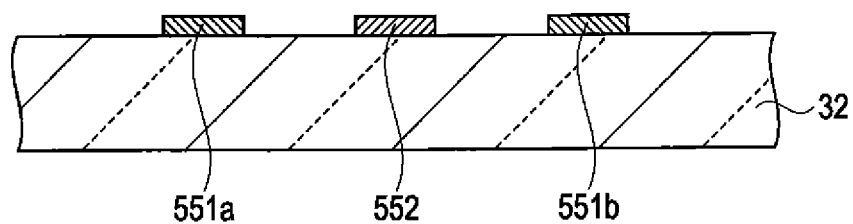
FIG. 21 is a schematic cross sectional view showing a method for manufacturing an organic EL device in order of processes.

First, as shown in FIG. 21, the first anode wiring 551a, the cathode wiring 552, and the second anode wiring 551b are formed on the transparent substrate 32. As the transparent substrate 32, a glass substrate and the like are mentioned. In the first light emitting element 31a, the first anode wiring 551a is used as the anode 35. In contrast, in the second light emitting element 31b, the second anode wiring 551b is used as the anode 35.

The cathode wiring 552 is used for connection with the cathode 37 (FIG. 20). The first anode wiring 551a, the second anode wiring 551b, and the cathode wiring 552 contain a metal oxide conductive film having light transmittance properties, such as ITO. The first anode wiring 551a, the second anode wiring 551b, the cathode wiring 552, and each layer described below can be successively formed using a known vacuum evaporation method, for example.

Figure 22:
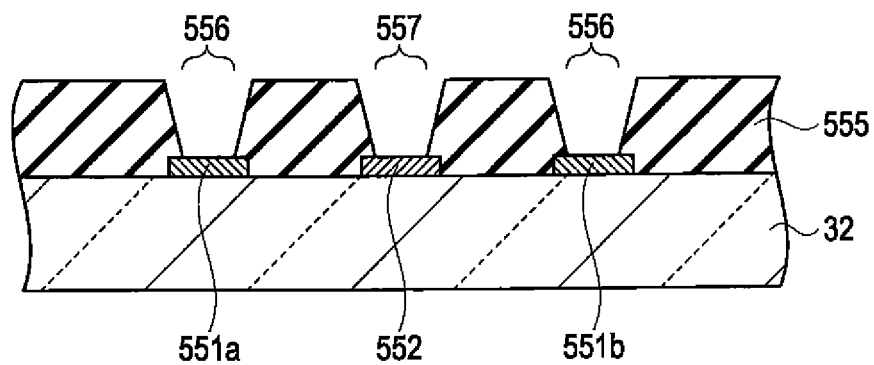
FIG. 22 is a schematic cross sectional view showing the method for manufacturing an organic EL device in order of processes.

Next, as shown in FIG. 22, an insulating film 555 is formed in a partial region on the transparent substrate 32 and the wirings (the first anode wiring 551a, the second anode wiring 551b, cathode wiring 552) so that the regions of a light emitting portion 556 and a contact portion 557 open. The insulating film 555 is formed with an acrylic resin, a polyimide resin, or the like, for example.

Figure 23:
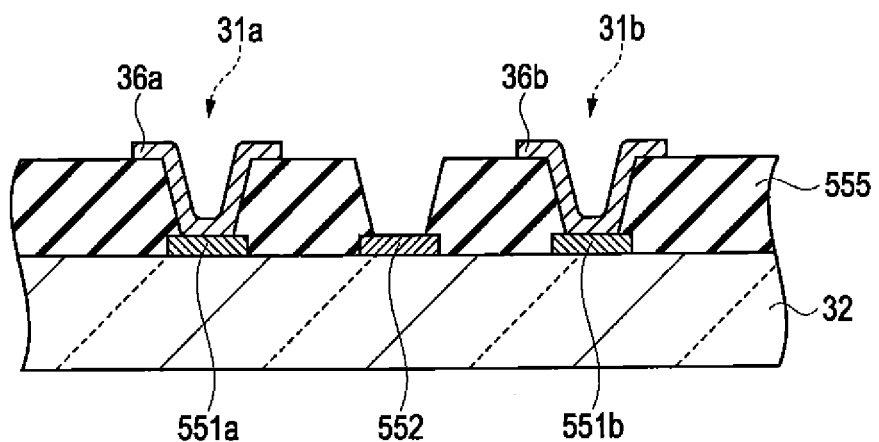
FIG. 23 is a schematic cross sectional view showing the method for manufacturing an organic EL device in order of processes.

Next, as shown in FIG. 23, the light emitting functional layers 36a and 36b are formed. In detail, the light emitting functional layers 36a and 36b are formed on a part of the first anode wiring 551a and the insulating film 555 at the side of the first light emitting element 31a and on a part of the second anode wiring 551b and the insulating film 555 at the side of the second light emitting element 31b, respectively. In the light emitting functional layers 36a and 36b, the hole injection layer 41, the hole transporting layer 42, the light emitting layer 43, the electron transporting layer 44, and the electron injection layer 45 are laminated in order (shown in a single layer in FIG. 23) as described above.

Figure 24:
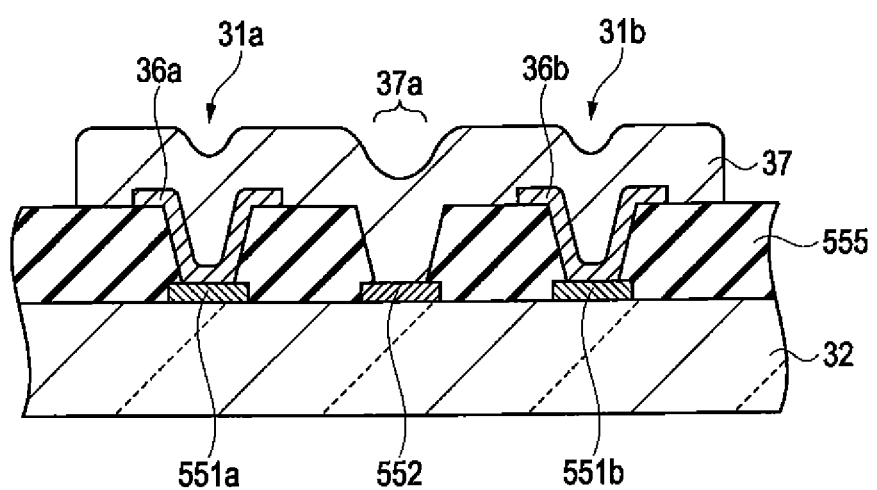
FIG. 24 is a schematic cross sectional view showing the method for manufacturing an organic EL device in order of processes.

Next, as shown in FIG. 24, the cathode 37 is formed. Specifically, the cathode 37 is formed over the light emitting functional layers 36a and 36b, the cathode wiring 552, the insulating film 555.

By forming as described above, the cathode wiring 552 can be commonly used in a pair of the first light emitting element 31a and the second light emitting element 31b. Since the first anode wiring 551a, the second anode wiring 551b, the cathode wiring 552, and the other respective layers can be formed in the same process, the processes therefor can be reduced and the first light emitting element 31a and the second light emitting element 31b having no difference in the polarity can be formed.

As described in detail above, according to the fourth embodiment, the following effects can be obtained.

(8) According to the fourth embodiment, the first light emitting element 31a and the second light emitting element 31b are connected to the cathode wiring 552 through the common contact portion 557 (FIG. 22). Thus, a region (common region 37a) that can be commonly used can be formed. Therefore, the area of the cathode 37 can be made small, and the area of a region (opening), other than the region of the cathode 37, through which a reflected light R passes can be enlarged. Thus, the opening ratio can be increased to thereby reduce the amount of a current for obtaining a required quantity of light. As a result, the light emitting elements 31a and 31b are inhibited from generating heat to thereby suppress deterioration of the light emitting elements 31a and 31b, and thus the life can be extended.

(9) According to the fourth embodiment, when the film is formed by a vapor-deposition method, for example, the first light emitting element 31a and the second light emitting element 31b can be formed simply by changing a vapor deposition range and can be formed in the same and one process. Thus, the elements can be relatively easily formed.

Fifth Embodiment

Structure of Lighting Device

Figure 25:
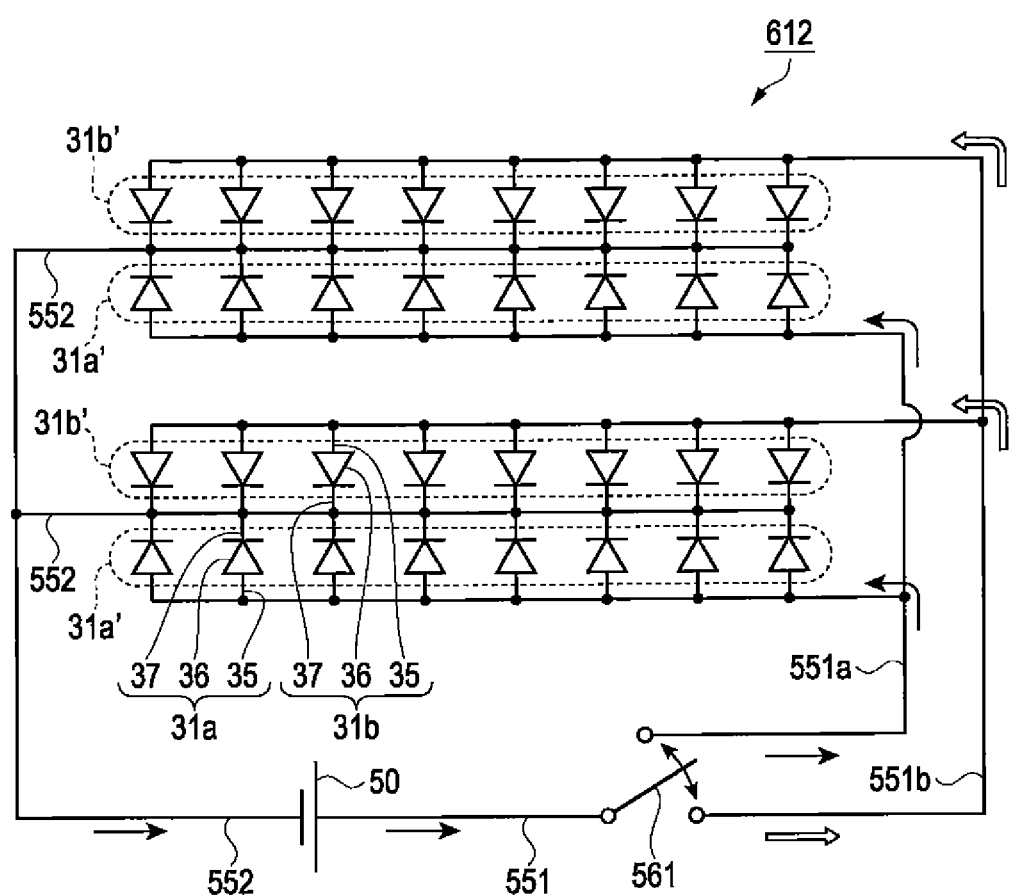
FIG. 25 is an equivalent circuit diagram showing the electrical structure of an organic EL device as a lighting device of a fifth embodiment.

FIG. 25 is an equivalent circuit diagram showing the electrical structure of an organic EL device as a lighting device of a fifth embodiment. Hereinafter, the structure of the organic EL device will be described with reference to FIG. 25.

An organic EL device 612 of the fifth embodiment is different from that of the fourth embodiment in that a current is applied to the first light emitting element group 31a' or the second light emitting element group 31b' using a switch 561 (or when one light emitting element group reaches the end of the life, the light emitting element group is switched to the other light emitting element group) to make the first light emitting element group 31a' and the second light emitting element group 31b' alternately emit light. Hereinafter, the same constituent members as those of the fourth embodiment are designated by the same reference numerals as those of the fourth embodiment, and the description thereof will be omitted or simplified here.

As shown in FIG. 25, the organic EL device 612 of the fifth embodiment has the anode wiring 551 connected to one side of the direct-current power supply 50 and the cathode wiring 552 connected to the other side of the direct-current power supply 50. The anode wiring 551 is branched to the first anode wiring 551a and the second anode wiring 551b. The switch 561 for applying a current to either the first anode wiring 551a or the second anode wiring 551b is provided between the anode wiring 551 and the first anode wiring 551a and between the anode wiring 551 and the second anode wiring 551b.

Between the first anode wiring 551a and the cathode wiring 552, two or more of the first light emitting elements 31a that are connected in parallel and emit light by a forward direction current are provided similarly as in the fourth embodiment. In contrast, between the second anode wiring 551b and the cathode wiring 552, two or more of the second light emitting elements 31b that are connected in parallel and emit light by a forward direction current are provided.

In detail, in the organic EL device 612 of the fifth embodiment, when the direct-current power supply 50 is in the ON state, a current flows to only one of the first anode wiring 551a and the second anode wiring 551b unlike the fourth embodiment in which a current flows to both the first anode wiring 551a and the second anode wiring 551b. Therefore, the first light emitting element groups 31a' and the second light emitting element groups 31b' alternately emit light by switching of the switch 561. As a preferable example of the switch 561, a double pole single throw analog-switch can be used.

Similarly as in the fourth embodiment, the first light emitting element groups 31a' and the second light emitting element groups 31b' are connected by the two anode wirings 551a and 551b and the single cathode wiring 552. More specifically, the cathode wiring 552 is commonly used in the first light emitting element groups 31a' and the second light emitting element groups 31b'.

Thus, since the cathodes 37 of the first light emitting elements 31a and the cathodes 37 of the second light emitting elements 31b are connected to the cathode wiring 552 through the common contact portion 557 (FIG. 22), a region (common region 37a) of the cathodes 37 that is commonly used can be formed. Therefore, the area of the cathode 37 can be made small in the light emitting region 553, and the area through which a reflected light R passes can be enlarged. Thus, the opening ratio can be increased to thereby reduce the amount of a current for obtaining a required quantity of light. As a result, the light emitting elements 31 are inhibited from generating heat to thereby suppress deterioration of the light emitting elements 31.

As described in detail above, according to the fifth embodiment, the following effects can be obtained in addition to the effects of (8) and (9) of the fourth embodiment described above.

(10) According to the fifth embodiment, the first light emitting elements 31a connected to the first anode wiring 551a and the second light emitting elements 31b connected to the second anode wiring 551b can be made to alternately emit light using the switch 561. Thus, for example, by making one kind of the light emitting elements (e.g., first light emitting elements 31a) continuously emit light until the luminance decreases to a lower threshold luminance, and then switching to the other kind of the light emitting elements (e.g., second light emitting elements 31b) and making the same continuously emit light, the light emitting period of time can be extended compared with the case where only one light emitting element is made to continuously emit light. As a result, the life of the lighting device (organic EL device 612) can be extended. In addition, when problems (unusual state) arise in one kind of the light emitting elements, light can be made to emit using the other kind of the light emitting elements.

(11) According to the fifth embodiment, the first light emitting element groups 31a' and the second light emitting element group 31b' can be made to alternately emit light. Thus, while one light emitting element group is emitting light, the other light emitting element group does not emit light. Thus, the other light emitting element group can be cooled. As a result, deterioration of the light emitting elements 31a and 31b due to that the temperature of the light emitting elements 31a and 31b becomes high is suppressed to delay the time when the luminance decreases (display quality deteriorates) compared with the case where only one light emitting element is made to continuously emit light, and thus the life can be extended.

Sixth Embodiment

Structure of Lighting Device

Figure 26:
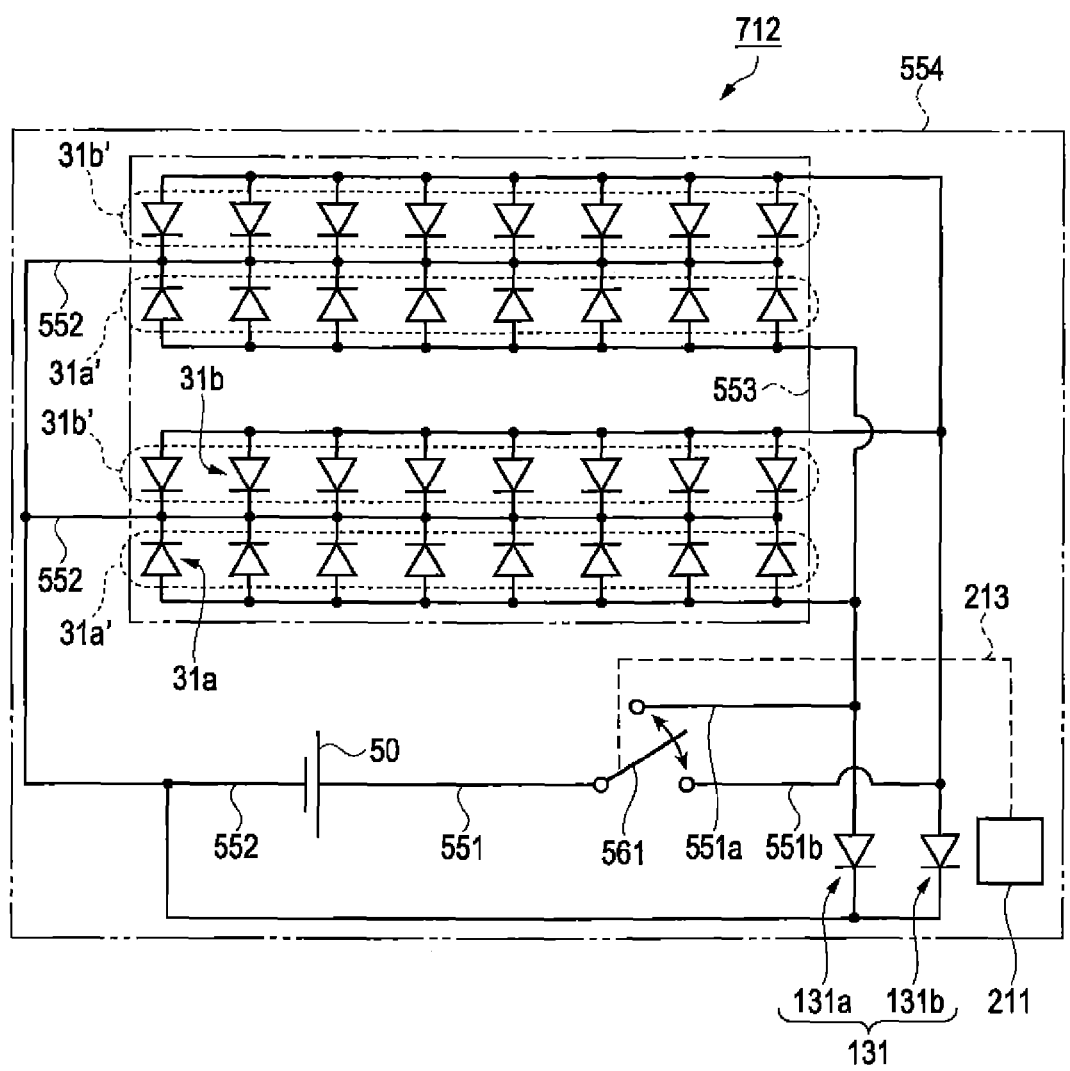
FIG. 26 is an equivalent circuit diagram showing the electrical structure of an organic EL device as a lighting device of a sixth embodiment.

FIG. 26 is an equivalent circuit diagram showing the electrical structure of an organic EL device as a lighting device of a sixth embodiment. Hereinafter, the structure of the organic EL device will be described with reference to FIG. 26.

An organic EL device 712 of the sixth embodiment is different from that of the fourth embodiment in that a light emitting element for detection 131 and a detector (optical sensor 211) for detecting the luminance of the first light emitting elements 31a and the second light emitting elements 31b are provided. Hereinafter, the same constituent members as those of the fourth embodiment are designated by the same reference numerals as those of the fourth embodiment, and the description thereof will be omitted or simplified here.

As shown in FIG. 26, the organic EL device 712 of the sixth embodiment has the anode wiring 551 connected to one side of the direct-current power supply 50 and the cathode wiring 552 connected to the other side of the direct-current power supply 50 similarly as in the fifth embodiment. The anode wiring 551 can be electrically connected to the first anode wiring 551a and the second anode wiring 551b through the switch 561, and the current flowing direction can be switched.

In such an organic EL device 712, the light emitting element for detection 131 (131a and 131b) to be used for detecting luminance is provided between the anode wiring 551a and the cathode wiring 552 and between the anode wiring 551b and the cathode wiring 552 as a characteristic portion of the sixth embodiment. Specifically, the light emitting element for detection 131 has a first light emitting element for detection 131a that emits light when a current flows to the side of the first anode wiring 551a and a second light emitting element for detection 131b that emits light when a current flows to the side of the second anode wiring 551b. More specifically, when the first light emitting elements 31a provided in the light emitting region 553 are made to emit light, the first light emitting element for detection 131a also simultaneously emits light. In contrast, when the second light emitting elements 31b provided in the light emitting region 553 are made to emit light, the second light emitting element for detection 131b also simultaneously emits light.

An optical sensor 211 as a detector that is adjacent to the two light emitting elements for detection 131 (131a, 131b) and detects luminance. As the optical sensor 211, photodiodes, phototransistors, and CSDs can be used, for example. Thus, by detecting the luminance through the light emitting element for detection 131, the luminance of the first light emitting elements 31a and the second light emitting elements 31b in the light emitting region 553 can be detected. According to the detection results of the luminance by the optical sensor 211 (e.g., when the luminance decreases to a lower threshold value), the connection state of the switch 561 is switched.

Specifically, the operation when the anode wiring 551 is electrically connected to the first anode wiring 551a will be first described. When the direct-current power supply 50 is in the ON state, a current flows to the side of the first anode wiring 551a, and then the first light emitting element groups 31a' emit light, and simultaneously therewith the first light emitting element for detection 131a emits light. At this time, the optical sensor 211 detects the luminance of the first light emitting element for detection 131a. Then, when the luminance reaches a lower threshold value (when the luminance decreases to a given luminance), light emission is switched to the light emission by the second light emitting element groups 31b' from the light emission by the first light emitting element groups 31a'.

Next, the operation when the anode wiring 551 is electrically connected to the second anode wiring 551b will be described. When the direct-current power supply 50 is in the ON state, a current flows to the side of the second anode wiring 551b, and then the second light emitting element groups 31b' emit light, and simultaneously therewith the second light emitting element for detection 131b emits light. At this time, the optical sensor 211 detects the luminance of the second light emitting element for detection 131b. Then, when the luminance reaches a lower threshold value, the organic EL device 712 is replaced by a new organic EL device 712, for example.

It is preferable to provide a switch mechanism 213 for switching the connection state of the switch 561 according to the detection value of the optical sensor 211. Specifically, the switch mechanism 213 is provided so that the optical sensor 211 and the switch 561 are linked through the switch mechanism 213.

More specifically, the first light emitting element groups 31a' are first made to emit light. Then, by sending a signal to the switch mechanism 213 when the optical sensor 211 judges that the luminance of the first light emitting element for detection 131a decreases to a lower threshold luminance, the connection state of the switch 561 is changed, whereby light emission is switched from the light emission by the first light emitting element groups 31a' to the light emission by the second light emitting element groups 31b'. Thus, the light emission can be automatically switched without reducing the luminance to be lower than the lower threshold value.

The light emitting element for detection 131 is preferably provided in the surrounding region 554 outside the light emitting region 553 of the organic EL device 712. Since the optical sensor 211 is not disposed in the light emitting region 442, the luminance can be detected without reducing a luminance required for the light emitting region 553. Since the first light emitting element for detection 131a and the second light emitting element for detection 131b corresponding to the two light emitting elements 31a and 31b (light emitting element 31) are provided in the surrounding region 554, it can be judged that which one of the light emitting element 31 (31a, 31b) emits light by confirming the lighting condition of the two light emitting elements.

As described in detail above, according to the sixth embodiment, the following effects can be obtained in addition to the effects of (8) to (11) of the embodiments described above.

(12) According to the sixth embodiment, the optical sensor 211 is provided. Thus, the luminance of the first light emitting elements 31a and the second light emitting elements 31b can be confirmed. Thus, compared with a method for visually judging the luminance and switching the light emitting elements, it becomes possible to accurately switch the light emitting elements from one kind of the light emitting elements to the other kind of the light emitting elements. Furthermore, since the optical sensor 211 detects the luminance, light can be made to always emit with a luminance higher than the lower threshold luminance.

(13) According to the sixth embodiment, since the switch mechanism 213 is provided, the connection state of the switch 561 can be automatically switched based on the detection results of the optical sensor 211. Thus, for example, one kind of the light emitting elements are made to emit light until the luminance reaches a lower threshold luminance, and then the light emitting elements can be automatically switched to the other kind of the light emitting elements to make the other kind of the light emitting elements emit light.

(14) According to the sixth embodiment, the light emitting elements for detection 131a and 131b are provided in the surrounding region 554 which is a region surrounding the light emitting region 553. Thus, the luminance of the light emitting elements 31a and 31b can be detected without reducing a luminance required in the light emitting region 553.

Seventh Embodiment

Structure of Electronic Device

Figure 27:
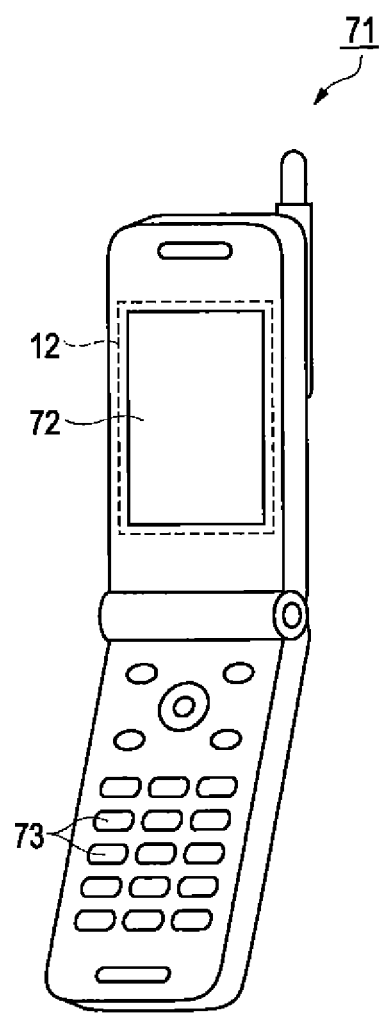
FIG. 27 is a schematic view showing a cellular phone as an example of an electronic device having an organic EL device.

FIG. 27 is a schematic view showing a cellular phone as an example of an electronic device having the organic EL device described above. Hereinafter, the structure of the cellular phone having the organic EL device will be described with reference to FIG. 27.

As shown in FIG. 27, a cellular phone 71 has a display portion 72 and operation buttons 73. The display portion 72 can perform high-definition display in which, for example, the light emission period of time can be increased, by the organic EL device 12, 112, 212, 512, 612, and 712 placed inside thereof. The above-described organic EL devices 12, 112, 212, 512, 612, and 712 can be used for various electronic devices, such as mobile computers, digital cameras, digital video cameras, devices on vehicles, audio devices, exposure devices, or lighting devices, in addition to the cellular phone 71.

As described in detail above, according to the seventh embodiment, the following effect can be obtained.

(15) The seventh embodiment can provide electronic devices in which deterioration of the light emitting elements 31a and 31b is suppressed to achieve a long life.

The embodiments are not limited to the embodiments above, and the invention can also be carried out in the following aspects.

Modification 1

Figure 28:
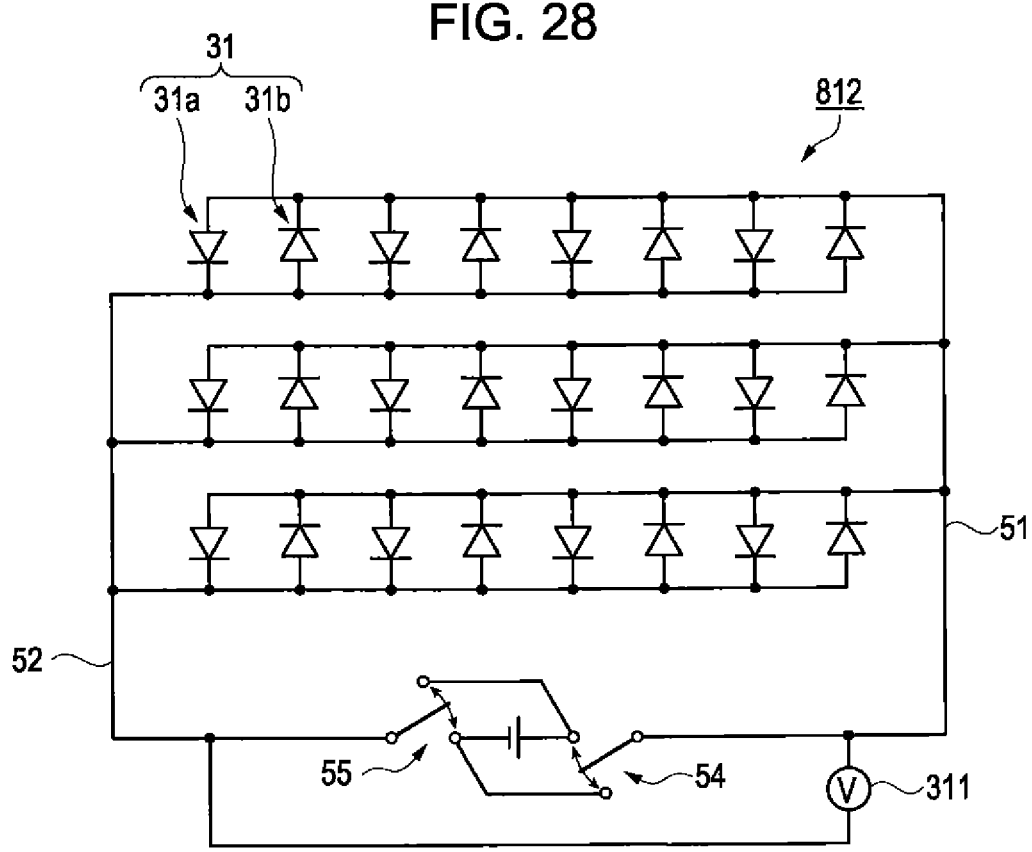
FIG. 28 is an equivalent circuit diagram electrically showing the structure of an organic EL device of a modification 1.
Figure 29A:
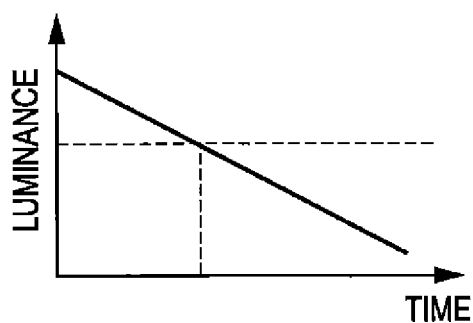
FIGS. 29A and 29B are graphs showing the relationship between time and luminance and the relationship between time and voltage, respectively.
Figure 29B:
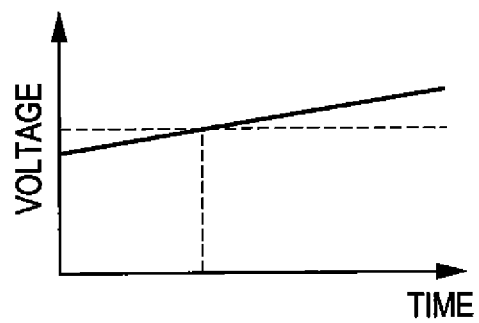

The luminance may be determined from a voltage value, for example, as shown in FIG. 28 without being limited to detecting the luminance of the first light emitting elements 31a or the second light emitting elements 31b using the optical sensor 111 as in the second embodiment. FIG. 28 is an equivalent circuit diagram electrically showing the structure of the organic EL device 812 of a modification 1. FIG. 29A is a graph showing the relationship between the time and the luminance. FIG. 29B is a graph showing the relationship between the time and the voltage.

First, as shown in FIG. 29A, when the light emitting elements 31 are driven with a fixed current density, the luminance decreases with time as the characteristics of the light emitting elements 31. As shown in FIG. 29B, when the luminance decreases, the voltage increases with time.

Using such characteristics, when a voltmeter 311 as a detector disposed between the first wiring 51 and the second wiring 52 as shown in FIG. 28 detects a voltage value as a lower threshold luminance (when the luminance decreases to a threshold luminance), the switches 54 and 55 are switched to change the light emission from the light emission by the first light emitting elements 31a to light emission by the second light emitting elements 31b, for example. The switches 54 and 55 may be manually switched or may be automatically switched using the switch mechanism 113 (FIG. 14). According to the structure, a given luminance can be maintained without reducing the luminance to be lower than the lower threshold value. Compared with the case where light is made to emit by only one light emitting element, light can be made to emit for a long time. Even when light is not directly detected, the luminance can be determined by a driving voltage.

Modification 2

The following structure may be acceptable in place of making the first light emitting elements 31a continuously emit light until the luminance thereof decreases to a lower threshold value, and then switching to the second light emitting elements 31b, and making the second light emitting elements 31b continuously emit light as described in the second embodiment or the modification 1 above. For example, the luminance of one kind of the light emitting elements (e.g., first light emitting elements 31a) and the other kind of the light emitting elements (e.g., second light emitting elements 31b) may be gradually reduced. Specifically, using the optical sensor 111 or the voltmeter 311, when the luminance of one kind of the light emitting elements decreases to a given luminance, the light emission is switched to the light emission by the other kind of the light emitting elements, and then the luminance is reduced to a given luminance. Thereafter, the light emitting elements are switched to the one kind of the light emitting elements, and light is made to emit until the luminance decreases to a still lower luminance. The operation is gradually repeated until a lower threshold luminance is achieved. According to the structure, since the luminance gradually decreases little by little, the characteristics can be inhibited from being sharply changed.

Modification 3

Without being limited to the structure such that the first light emitting elements 31a and the second light emitting elements 31b emit white light as described above, light emitting layers may be colored with different colors so that the first light emitting elements 31a may emit red light and the second light emitting elements 31b may emit green light, for example. According to the structure, red lighting or green lighting can be created by changing the current flowing direction (current flowing wiring). For example, red lighting and green lighting may be used for surface sequential driving. In this case, green lighting is preferably added.

Modification 4

Figure 30:
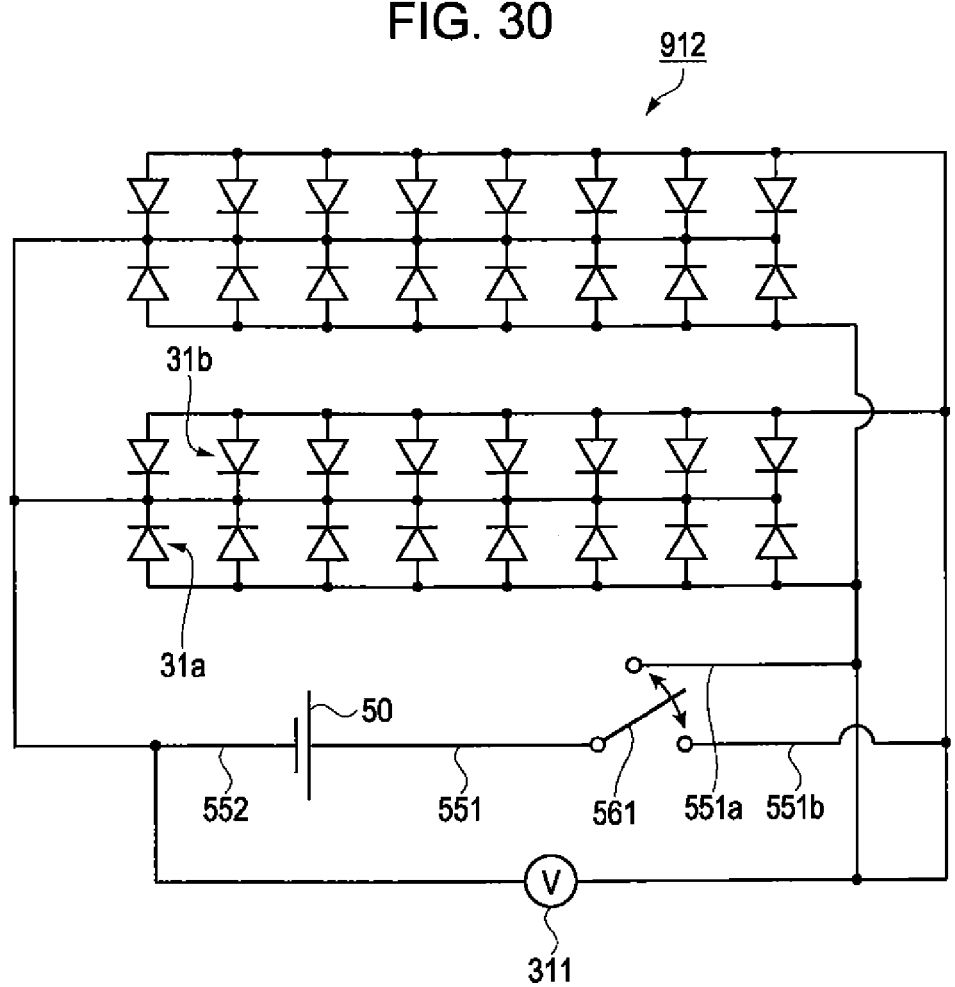
FIG. 30 is an equivalent circuit diagram electrically showing the structure of an organic EL device of a modification 4.
Figure 31A:
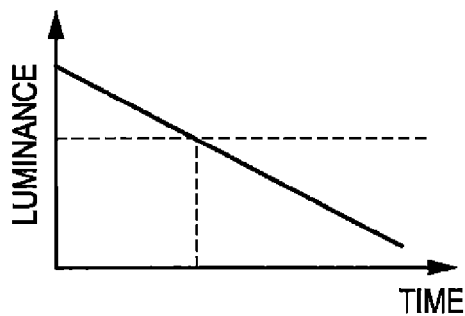
FIGS. 31A and 31B are graphs showing the relationship between time and luminance and the relationship between time and voltage, respectively.
Figure 31B:
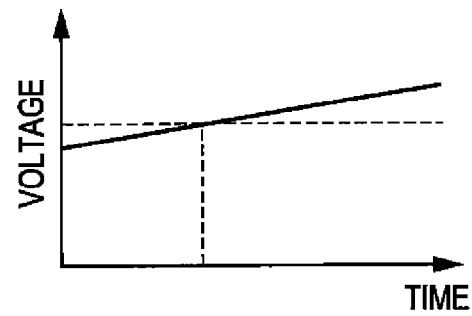
Figure 32:
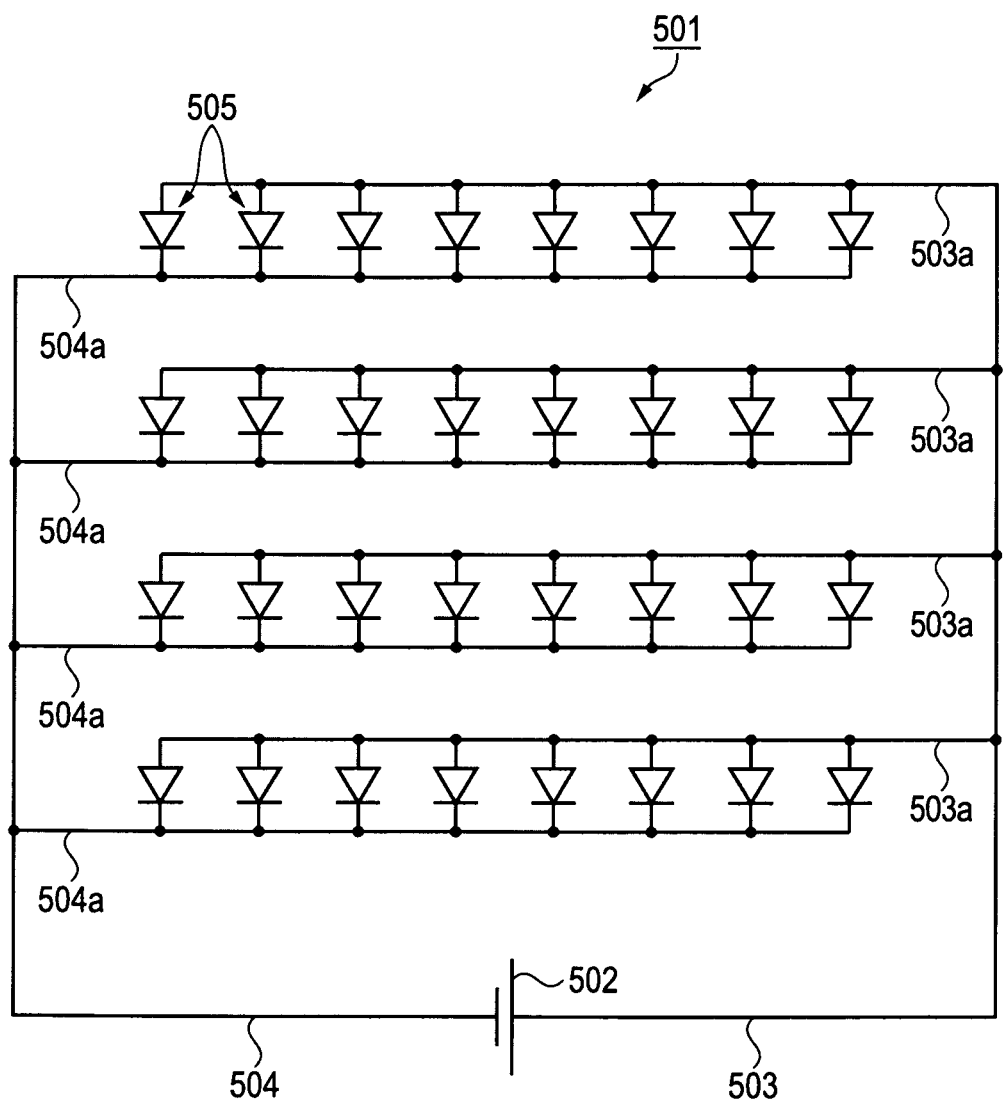
FIG. 32 is an equivalent circuit diagram showing the electrical structure of a conventional front light.

Without being limited to detecting the luminance of the first light emitting elements 31a or the second light emitting elements 31b using the optical sensor 211 as in the sixth embodiment described above, the luminance may be determined from a voltage value, for example, as shown in FIG. 30. FIG. 30 is an equivalent circuit diagram electrically showing the structure of an organic EL device 912 of a modification 4. FIG. 31A is a graph showing the relationship between the time and the luminance. FIG. 31B is a graph showing the relationship between the time and the voltage.

First, when the light emitting elements 31 are driven with a fixed current density as shown in FIG. 31A, the luminance decreases with time as the characteristics of the light emitting elements 31. As shown in FIG. 31B, when the luminance decreases, the voltage increases with time.

Using such characteristics, when the voltmeter 311 as a detector disposed between the anode wiring 551 (551a and 551b) and the cathode wiring 552 as shown in FIG. 30 detects a voltage value as a lower threshold luminance (when the luminance decreases to a threshold luminance), the switch 561 is switched to change the light emission from the light emission by the first light emitting element groups 31a' to light emission by the second light emitting element groups 31b, for example. The switch 561 may be manually switched or may be automatically switched using the switch mechanism 213 (FIG. 26). According to the structure, a given luminance can be maintained without reducing the luminance to be lower than the lower threshold value. Compared with the case where light is made to emit by only one light emitting element group, light can be made to emit for a long time. Even when light is not directly detected, the luminance can be determined by a driving voltage.

Modification 5

As described in the fifth embodiment, the sixth embodiment, and the modification 4 above, the following structure may be acceptable in place of making the first light emitting elements 31a continuously emit light until the luminance thereof decreases to a lower threshold value, and then switching to the second light emitting elements 31b, and making the second light emitting elements 31b continuously emit light. For example, the luminance of one kind of the light emitting elements (e.g., first light emitting elements 31a) and the other kind of the light emitting elements (e.g., second light emitting elements 31b) may be gradually reduced. Specifically, using the optical sensor 211 or the voltmeter 311, when the luminance of the one kind of the light emitting elements decreases to a given luminance, the light emission is switched to the light emission by the other kind of the light emitting elements, and then the luminance is reduced to a given luminance. Thereafter, the light emitting elements are switched to the one kind of the light emitting elements, and light is made to emit until the luminance decreases to a still lower luminance. The operation is gradually repeated until a lower threshold luminance is achieved. According to the structure, since the luminance gradually decreases little by little, the characteristics can be inhibited from being sharply changed.

Modification 6

As described above, the organic EL device 12, 112, 212, 512, 612, 712, 812, and 912 are not limited to a bottom emission type, and may be applied as a top emission type.

Modification 7

As described above, without being limited to using the lighting device as the front light of liquid crystal displays, the lighting device may be used as common lighting, for example.

The entire disclosure of Japanese Patent Application No. 2009-204434, filed Sep. 4, 2009 and 2009-208982, filed Sep. 10, 2009 are expressly incorporated by reference herein.

What is claimed is:

1. A lighting device at least comprising:
    a plurality of light emitting elements that emit light by a forward direction current flowing from a first terminal to a second terminal;
    a direct-current power supply; and
    an anode wiring and a cathode wiring for supplying electrical power to the plurality of light emitting elements from the direct-current power supply;
    the lighting device having a plurality of light emitting units having:
    a first light emitting element group containing the plurality of light emitting elements in which the first terminal is connected to a first anode wiring branched from the anode wiring;
    a second light emitting element group containing the plurality of light emitting elements in which the first terminal is connected to a second anode wiring branched from the anode wiring;
    a common cathode wiring branched from the cathode wiring that is to be connected in common to the first light emitting element group and the second terminal of the plurality of light emitting elements in the second light emitting element group, and
    at least one of the plurality of light emitting elements being disposed such that the second terminal of the at least one of the plurality of light emitting elements faces substantially towards the second terminal of another of the plurality of light emitting elements.

2. The lighting device according to claim 1 further comprising:
    a switch for exclusively switching connection between the anode wiring and the first anode wiring or the second anode wiring.

3. The lighting device according to claim 1 further comprising:
    a detector for detecting the luminance of the light emitting elements or the voltage between both ends of the light emitting elements.

4. The lighting device according to claim 3, wherein the switch preferably electrically connects the anode wiring and the first anode wiring or the second anode wiring branched from the anode wiring according to the luminance or the voltage detected by the detector.

5. The lighting device according to claim 3, wherein the detector is an optical sensor.

6. The lighting device according to claim 5 further comprising:
    a light emitting region in which the plurality of light emitting elements are disposed; and
    a light emitting element for detection provided in the circumference of the light emitting region,
    the detector detecting the luminance of light emitted by the light emitting elements for detection.

* * * * *